US00RE40188E

(19) United States
(12) Reissued Patent
Lofstrom

(10) Patent Number: US RE40,188 E
(45) Date of Reissued Patent: Mar. 25, 2008

(54) SYSTEM AND METHOD FOR PROVIDING AN INTEGRATED CIRCUIT WITH A UNIQUE IDENTIFICATION

(75) Inventor: Keith Lofstrom, Beaverton, OR (US)

(73) Assignee: ICID, LLC, Beaverton, OR (US)

(21) Appl. No.: 10/318,583
(22) Filed: Dec. 12, 2002

Related U.S. Patent Documents

Reissue of:
(64) Patent No.: 6,161,213
Issued: Dec. 12, 2000
Appl. No.: 09/251,692
Filed: Feb. 17, 1999

(51) Int. Cl.
*G06F 17/50* (2006.01)
*G06F 19/00* (2006.01)
*G01R 31/02* (2006.01)

(52) U.S. Cl. ..... 716/4; 716/8; 700/115; 702/73; 324/764

(58) Field of Classification Search ..... 716/1–21; 702/73; 700/115–116; 324/764
See application file for complete search history.

(56) References Cited

U.S. PATENT DOCUMENTS 4,150,331 A * 4/1979 Lacher ..... 324/133
4,419,747 A * 12/1983 Jordan ..... 365/201
4,510,673 A * 4/1985 Shils et al. ..... 438/15
4,766,516 A * 8/1988 Ozdemir et al. ..... 361/820
4,996,647 A * 2/1991 Gasser ..... 702/73
5,051,374 A * 9/1991 Kagawa et al. ..... 438/449
5,051,895 A * 9/1991 Rogers ..... 717/168
5,056,061 A * 10/1991 Akylas et al. ..... 365/96
5,079,725 A * 1/1992 Geer et al. ..... 714/726
5,350,715 A * 9/1994 Lee ..... 438/16
5,553,022 A * 9/1996 Weng et al. ..... 365/189.01
5,615,126 A * 3/1997 Deeley et al. ..... 716/1
5,642,307 A * 6/1997 Jernigan ..... 365/103
5,742,526 A * 4/1998 Voshell et al. ..... 700/115
5,787,174 A * 7/1998 Tuttle ..... 713/189
5,818,738 A * 10/1998 Effing ..... 702/117

OTHER PUBLICATIONS

Tomohisa Mizuno, Jun–ichi Okamura and Akira Toriumi, "Experimental Study of Threshold Voltage Fluctuation Due to Statistical Variation of Channel Dopant Number in MOSFET's," IEEE Transactions on Electron Devices, vol. 41 No. 11, Nov. 1994, pp. 2216–2221.*
Xinghai Tang, Vivek K. De and James D. Meindl, "Intrinsic MOSFET Parameter Fluctuations Due to Random Dopanat Placement," IEEE Transactions on Very Large Scale Integration (vlsi) Systems, vol. 5, No. 4, Dec. 1997, pp. 369–376.*
T. Mizuno et al., "Experimental Study of Threshold Voltage Fluctuation Due to Statistical Variation of Channel Dopant Number in MOSFETs," IEEE Transactions on Electron Devices, vol. 41, No. 11, Nov. 1994, pp. 2216–2221.*
X. Tang et al., "Intrinsic MOSFET Parameter Fluctuations Due to Random Dopant Placement," IEEE Transactions on VLSI Systems, vol. 5, No. 4, Dec. 1997, pp. 369–376.*

* cited by examiner

*Primary Examiner*—Leigh M. Garbowski
(74) *Attorney, Agent, or Firm*—Loudermilk & Associate

(57) ABSTRACT

An integrated circuit identification device (ICID) to be incorporated into an integrated circuit (IC) includes an array of electronic cells in which the magnitude of an output signal of each cell is a function of randomly occurring parametric variations which vary from cell-to-cell. The ICID also includes a circuit for measuring the output of each cell and for producing output data having a value reflecting the particular combination of measured characteristics of all of the elements of the array. When we make the number of elements in the array large enough, we insure that to a high degree of probability, the pattern of measured array cell characteristics for an ICID embedded in any one IC will be unique and distinguishable from such patterns measured by ICIDs embedded in millions of other ICs. Thus the value of the output data produced by an ICID circuit acts as a unique "fingerprint" for the IC in which it is installed, and can be used as a unique identification (ID) for that IC.

164 Claims, 10 Drawing Sheets

254

| | |
|---|---|
| CELL 0 | +4 mV |
| CELL 1 | -1 mV |
| CELL 2 | -3 mV |
| CELL 3 | +2 mV |
| CELL 4 | +3 mV |
| CELL 5 | 0 mV |
| CELL 6 | +1 mV |
| CELL 7 | +3 mV |

SORT

256

| | |
|---|---|
| CELL 2 | -3 mV |
| CELL 1 | -1 mV |
| CELL 5 | 0 mV |
| CELL 6 | +1 mV |
| CELL 3 | +2 mV |
| CELL 4 | +3 mV |
| CELL 7 | +3 mV |
| CELL 0 | +4 mV |

SYSTEM AND METHOD FOR PROVIDING AN INTEGRATED CIRCUIT WITH A UNIQUE IDENTIFICATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to a system for uniquely identifying an integrated circuit (IC), and in particular to a device that may be embedded in the IC which, due to randomly occurring chip-to-chip or device-to-device parametric variations, produces a unique output identification for each IC chip in which it is implemented.

2. Description of Related Art

Integrated circuits are manufactured with batch processing intended to make all integrated circuit chips identical, thereby lowering manufacturing costs and improving quality. However, it is useful to be able to distinguish each individual integrated circuit from all others, for example to track its source of manufacture, or to identify a system employing the integrated circuit. Individually identifiable integrated circuits can be used to validate transactions, route messages, track items through customs, verify royalty counts, recover stolen goods, validate software, and many other uses.

It has been known to include circuits within a chip that produce a signal identifying the nature or type of the chip. U.S. Pat. No. 5,051,374, issued Sep. 24, 1991 to Kagawa et al., "Method of manufacturing a semiconductor device with identification pattern", shows a technique for identifying the type of mask-programmed read-only memory (ROM). ROMs of different types may have indistinguishable visible structures, but the special processing steps described in this patent produce a visible pattern on the ROM identifying its nature. U.S. Pat. No. 4,150,331 issued Apr. 17, 1979 to Lacher, "Signature encoding for integrated circuits", describes an embedded system that puts a type-specific identifier on the pins of a circuit when stimulated. U.S. Pat. No. 5,079,725 issued Jan. 7, 1992 to Geer et al., "Chip Identification Method for use with Scan Design Systems and Scan Testing Techniques", describes a method for incorporating type specific identification into a scan test chain. These methods of identification are useful for indicating the type of component being manufactured or placed in an assembly, but they do not distinguish individual chip one from another.

It has been also known to customize each individual chip as it is manufactured in order to make it uniquely identifiable. Such customization may be performed as the chip is fabricated, typically by inscribing pattern on its die, or after it is fabricated, for example, by employing electrical or laser signals to alter its circuitry in some way. U.S. Pat. No. 5,642,307 issued Jun. 24, 1997 to Jernigan, "Die Identifier and Die Identification Method" includes a non-volatile, programmable read-only memory (PROM) on a chip. After the chip is fabricated, the PROM is programmed to store a date, a lot number, a wafer number, and a wafer position, as well as other useful manufacturing data. U.S. Pat. No. 4,419,747, issued Dec. 6, 1983, to Jordan, "Method and Device for Providing Process and Test Information in Semiconductors", stores similar information in an extension of an existing programmable memory array. The information may be read back when an unusual combination of voltages is placed on the input pins and detected by the chip, overriding the normal function of the device.

U.S. Pat. No. 5,056,061, issued Oct. 8, 1991 to Akylas et al., "Circuit for encoding identification information on circuit die using FET capacitors" discloses the use of high voltage signals to break a capacitor structure within each individual chip so that some aspect of the chip's behavior is permanently altered in some identifiable way. U.S. Pat. No. 5,553,022, issued Sep. 3, 1996 to Weng et al., "Integrated circuit identification apparatus and method", performs a similar breakdown on the gate oxide of a MOSFET. In both cases an oxide is permanently altered, and this requires careful circuit design and process characterization to do reliably. U.S. Pat. No. 4,766,516, issued Aug. 23, 1988 to Ozdemir et al., "Method and apparatus for securing integrated circuits from unauthorized copying and use", teaches us to electronically after a semiconductor die with lasers or focused ion beams. While such approaches are effective to provide each chip with an ID, the additional processing steps needed to customize each individual chip add time and cost to the chip manufacturing process.

Other techniques do not result in an electrically detectable modification of the integrated circuit die. Instead, they physically inscribe a pattern onto an unused portion of the die surface, to be observed optically by a machine or by a person using a microscope. U.S. Pat. No. 5,350,715, issued Sep. 27, 1994 to Lee, "Chip identification scheme" teaches applying a pattern of dots to electrically inactive areas on each die site on a wafer. This may be done with an additional mask step applied to the whole wafer. U.S. Pat. No. 4,510,673, issued Apr. 16, 1995 to Shils et al., "Laser written chip identification method", describes using an X-Y controllable laser beam to produce identification patterns on the surface of a chip.

While such methods can provide each chip with a unique identification, they require special processing steps during the semiconductor manufacturing process that add cost and time to the manufacturing process. What is needed is a method for reliably and easily identifying and authenticating individual integrated circuits that does not require any additional manufacturing steps or equipment.

SUMMARY OF THE INVENTION

An integrated circuit identification (ICID) circuit in accordance with one aspect of the invention produces a unique identification number or record (ID) for each chip in which it is included even though the ICID circuit is fabricated on all chips using identical masks. The ICID circuit includes a set of circuit cells and produces its output ID based on measurements of outputs of those cells that are functions of random parametric variations that naturally occur when fabricating chips. When the number of cells is large enough, each of millions of chips can be provided with a unique identifying ID without having to customize each chip.

In accordance with another aspect of the invention, the cells are organized into an array and the ICID circuit also includes a circuit for selecting each cell of the array in turn, measuring that element's output, and producing the chip ID based on the pattern of measured outputs of all cells of the array. When the number of elements in the array is large enough, the pattern of measured array element characteristics for an ICID circuit of one IC chip will be unique to a high degree of probability. The identification pattern will differ from that of an ICID circuit of any other IC, even when similar ICID circuits are installed in millions of other IC chips. Thus the value of the output data produced by an ICID circuit acts as a unique :fingerprint: for the chip in which it is installed that can be employed as an easily accessed chip-unique ID.

In accordance with a further aspect of the invention, in a preferred embodiment thereof, the elements of the array are suitably pairs of metal oxide semiconductor field effect (MOSFET) transistors having interconnected sources and gates. The measurable output of each MOSFET pair represents the difference between their drain currents, which is highly susceptible to fluctuations that naturally occur in chip fabrication.

The ICID circuit of the present invention provides a means for enabling each of millions of chips to uniquely and reliably identify itself without having to customize each individual chip using costly and time-consuming additional processing steps during or after chip fabrication.

The concluding portion of this specification particularly points out and distinctly claims the subject matter of the present invention. However, those skilled in the art will best understand both the organization and method of operation of the invention, together with further advantages and objects thereof, by reading the following descriptions in view of the accompanying drawings wherein like reference characters refer to like elements.

BRIEF DESCRIPTION OF THE DRAWING(S)

Figure 19:
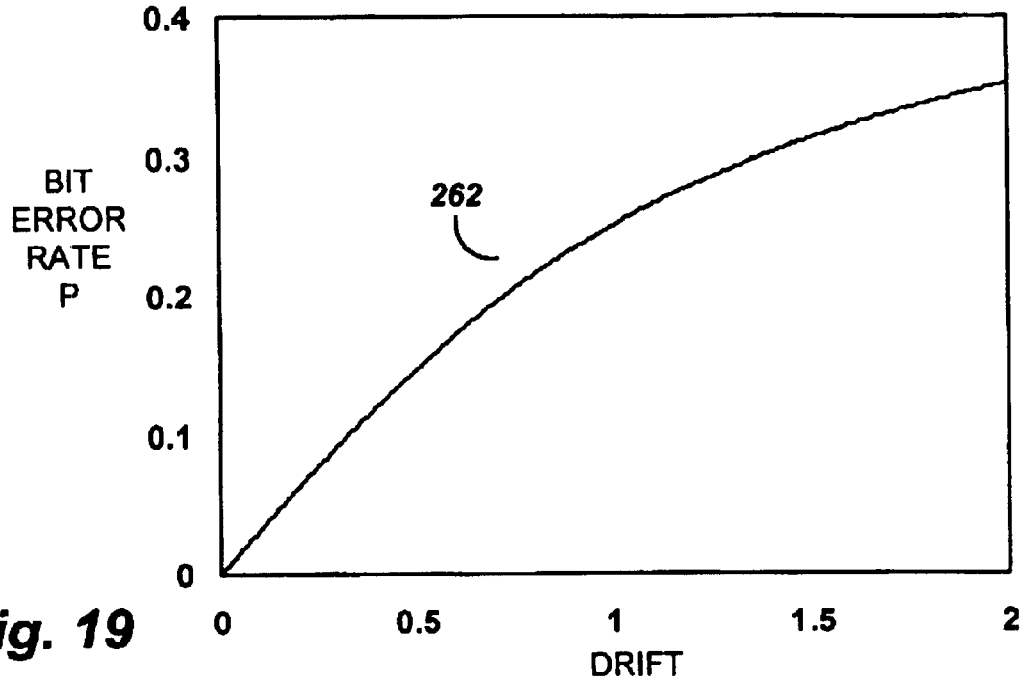
Figure 20:
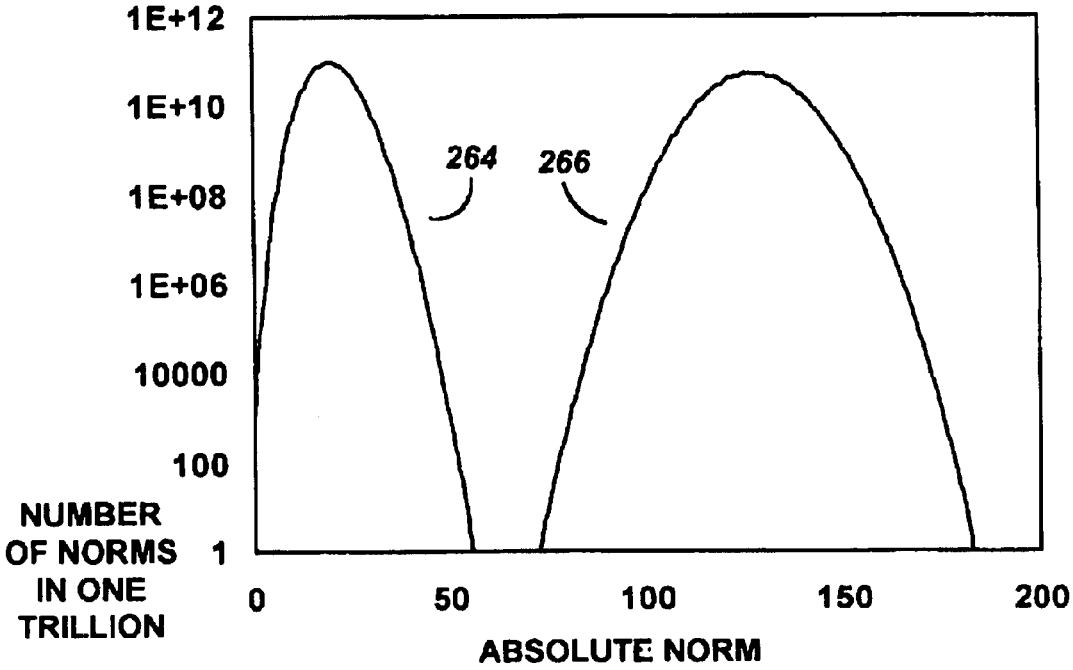

FIG. 19 plots the probability of bit errors as a function of threshold drift;

FIG. 20 plots the statistical distribution of absolute norms resulting from 25 percent threshold drift for one trillion samples.

DESCRIPTION OF THE PREFERRED EMBODIMENT(S)

Figure 1:
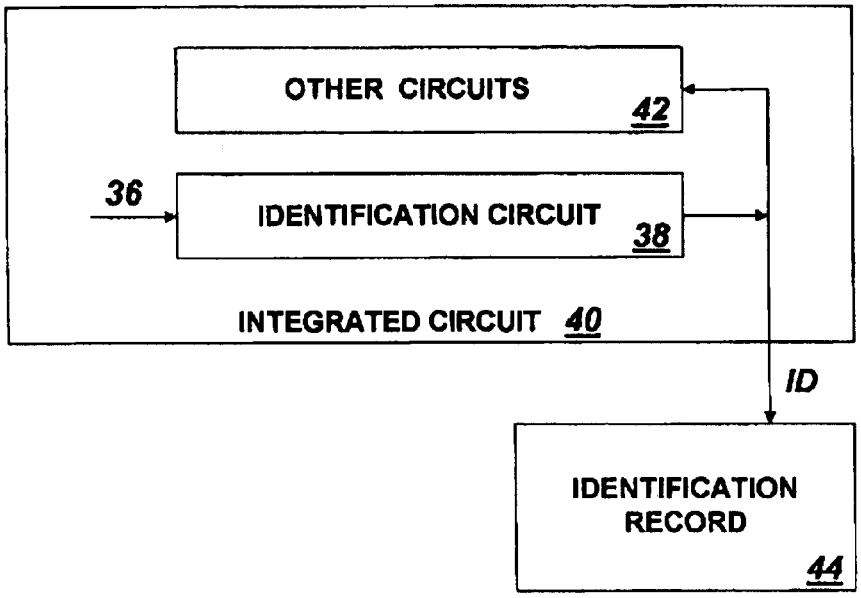
FIG. 1 illustrates in block diagram form an integrated circuit having installed therein an identification circuit (ICID) in accordance with the invention.

The present invention relates to an integrated circuit identification (ICID) circuit 38 as illustrated in FIG. 1 that may be incorporated into an integrated circuit (IC) chip 40 along with other circuits 42. In response to control and timing data arriving via control inputs 36, ICID 38 generates an output data sequence (ID) at IC output terminal ID that uniquely identifies IC chip 40. After fabricating IC chip 40, a manufacturer may record the output ID of ICID circuit 38 in an identification record 44. Thereafter that particular chip 40 can be identified whenever and wherever that chip may be found by the unique ID produced by its ICID 38 when control inputs 36 signal it to do so.

It has been known to provide each of a large number of IC chips with a non-volatile memory for storing and reading out an ID uniquely identifying each chip. However such prior art chip ID systems require that a separate ID be written into each individual IC using additional processing steps during or after IC fabrication. The additional customizing steps for each IC add time and cost to the IC manufacturing process. ICID 38, on the other hand, does not have to be customized in any way for each chip in which it is installed in order to ensure that its output ID is unique for each chip. Even though the same ICID 38 may be installed on millions of IC chips, the probability is low that the ICID circuits of any two chips will generate the same output ID number. The ICID circuit is therefore an improvement over prior art chip identification systems because it doesn't require any customization of individual ICs.

ICID 38 achieves this feat by deriving its output ID from measurements of a set of circuit parameters that naturally vary from chip-to-chip and from circuit element-to-element. Due to natural, random parametric variations, no two ICs are really alike. For example, try as we might, it is not possible to make two identical transistors even though we may form them by similar processes, using similar masks, in adjacent areas of the same IC die. We cannot make two transistors identical because their dimensions are the result of the random accumulation of photons through the photomask and their doping levels and distributions are the result of the random distribution of doping atoms from thermal diffusion and ion implantation. Designers have long been aware of the effect of such random parametric variations on the behavior of transistors and other IC circuit elements and have taken them into account when designing ICs. A good IC design ensures that all copies of an IC behave as expected even though the transistors and other circuit elements forming the ICs exhibit a random variation in operating characteristics from element-to-element and from chip-to-chip.

While such random parametric variations have been a problem that IC designers have had to overcome, ICID 38 of the present invention makes beneficial use of them. In the preferred embodiment of the invention, each ICID 38 includes an array of identically designed cells. Each cell is suitably a simple transistor circuit that produces a pair of currents whose difference is influenced by random parametric variations affecting the operating characteristics of the transistors forming the cell. ICID 38 measures the difference between the two output currents of each cell of the array and encodes the measurements for all cells into a single output ID that is unique to the particular combination of measurements. When the array is large enough, there is a very low probability that the cell array of an ICID 38 installed in any one IC chip will produce the same combination of measurements as an ICID circuit installed in any of millions of other IC chips. Thus an ID generated in such fashion can be used as a unique ID for each chip.

Figure 2:
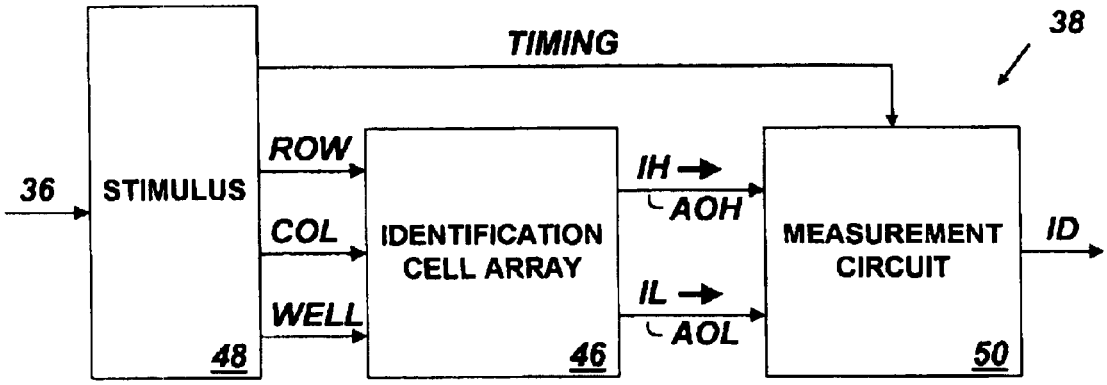
FIG. 2 illustrates the ICID device of FIG. 1 in more detailed block diagram form.

ICID 38 is advantageous over prior art chip identification systems because it does not require any custom modification to each individual chip during or after fabrication in order to make its ID unique. The acquisition and logging of a chip's ID can be easily and quickly done by an IC tester when it tests the chip's logic. ICID Architecture FIG. 2 illustrates ICID circuit 38 of FIG. 1 in more detailed block diagram form. ICID circuit 38 includes an array 46 of rows and columns of cells. Each cell of array 46, when selected produces a pair of output currents IH and IL on array output lines AOH and AOL. The IH and IL currents are produced by similar transistors within the selected cell and are nearly equal. But due to differences in the transistors resulting from random parametric variations, the IH and IL currents will not exactly match. The difference between the IH and IL currents will vary from cell to cell.

A stimulus circuit 48 responds to the control input 36 by supplying row select data (ROW) and a column select data (COL) to array 46 to individually select and stimulate each of its cells in turn. As it selects a cell, stimulus circuit 48 sends timing signals (TIMING) to a measurement circuit 50 telling it when to measure a difference between the currents IH and IL of the selected cell. In the preferred embodiment of the invention, each cell includes P channel, metal oxide silicon field-effect transistors (MOSFETs). Stimulus circuit 48 also produces an N-Well bias control line WELL for controlling the bias for the N-Well underneath the P channel MOSFETs in the identification cell array 46. When ICID circuit is enabled, the N-Well is biased on, at the positive supply voltage, allowing the identification array to operate. When the ICID circuit is disabled, the N-Well is biased to the negative supply voltage, along with all the other signal lines connected to the identification cell array 46. This eliminates electrical stresses on the identification cells when the ICID circuit is not being used, helping protect the cells against drift.

Measurement circuit 50, sequenced by TIMING strobes from stimulus circuit 48, measures the current difference between IH and IL for each cell and, as described in detail below, produces a serial output ID having a value that is base on the particular pattern of measured current differences for all cells of array 46.

Cell Array

Figure 3:
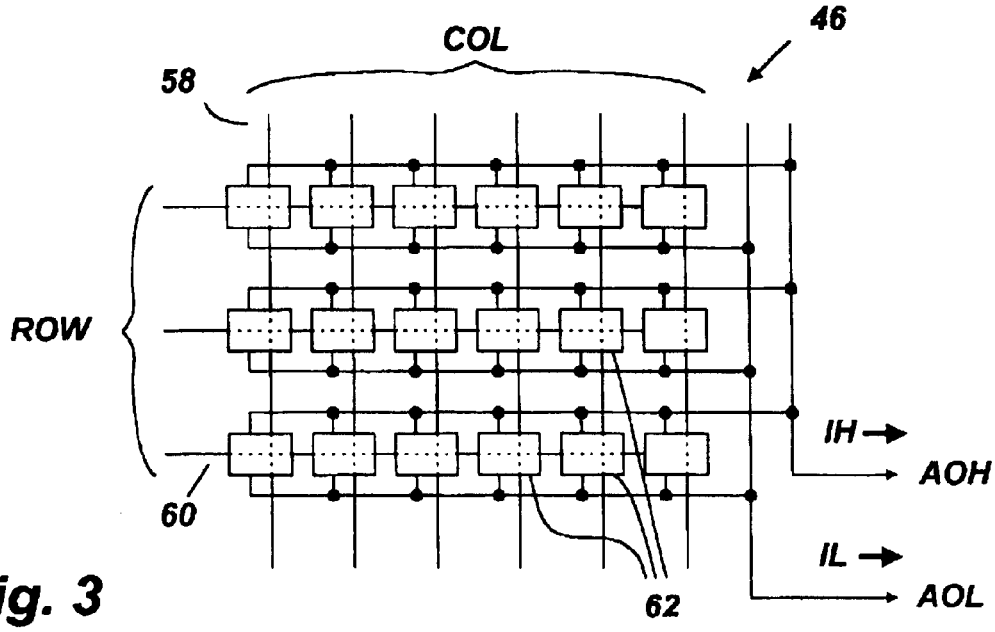
FIG. 3 illustrates the array of identification cells of FIG. 2 in more detailed block diagram form.
Figure 4:
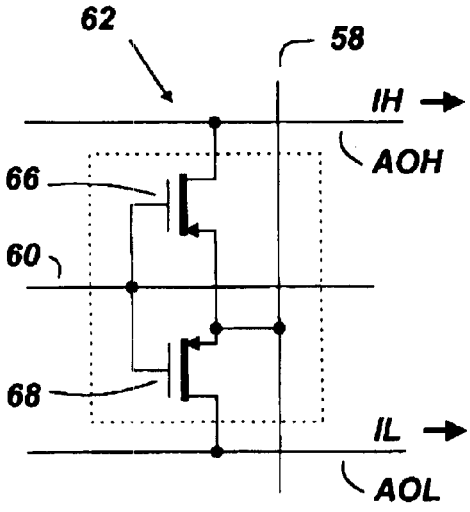
FIG. 4 is a schematic diagram illustrating a typical identification cell of FIG. 3.

FIG. 3 illustrates array 46 of FIG. 2 in more detailed block diagram form and FIG. 4 illustrates a typical cell 62 of array 46 in schematic diagram form. Although for simplicity FIG. 3 shows array as including a set of three rows and six columns of cells 62, the number of cells 62 that should be included in array 46 is largely a function of the number of ICs to be uniquely identified. As discussed below, when ICID 38 of FIG. 2 is to be employed in several million ICs, a larger array (for example 16×16) is required to provide the needed ID resolution.

FIG. 4 shows that each cell 62 includes a pair of substantially similar P channel MOSFETs 66 and 68 having gates connected in common to one bit 60 of the ROW select data from stimulus circuit 48 of FIG. 2 and having sources connected in common to one bit 58 of the COL select data from stimulus circuit 48. A pair of output wires, AOH and AOL, connected to all the cells of the array 46. The drains of all MOSFETs 66 of each given cell row connect to AOH, and the drains of all MOSFETs 68 connect to AOL. Stimulus circuit 48 of FIG. 2 selects and stimulates a particular cell 62 by pulling its COL select line 58 high, while pulling its ROW select data bat 60 to an analog bias voltage. This turns on both MOSFETs 66 and 68 of the cell, with the ROW and COL select bit line voltages adjusted to drive the two MOSFETs into the saturation region of operation. As the two MOSFETs of a selected cell 62 turn on they conduct current through their drains, and their drain currents appear on array output lines AOH and AOL. The AOH and AOL lines are terminated with loads inside the measurement circuit 50, and are biased at a sufficiency low voltage to insure that the unselected cells elsewhere on the selected row will not conduct.

If the MOSFET pair 66 and 68 in the selected cell were truly identical, they would produce identical drain currents into AOH and AOL. However since random parametric variations ensure that MOSFETS 66 and 68 will differ somewhat even though we try to make them similar, their drain currents IH and IL will be somewhat mismatched. The amount of mismatch reflects the amount of parametric variations between the two transistors.

Figure 5:
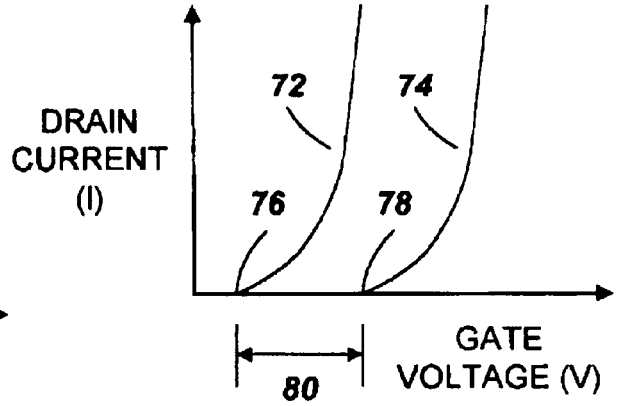
FIG. 5 is a graph illustrating the normal mismatch of drain currents found in two nominally identical P channel MOSFETs.

FIG. 5 plots the drain current of two MOSFETs having mismatched voltage thresholds, as the gate voltage is varied. The MOSFET producing current 72 turns on at threshold 76, while the MOSFET producing current 74 turns on at threshold 78 resulting in a threshold voltage mismatch 80. Since MOSFETs are nonlinear devices, the drain current difference between the devices can be expected to increase with voltage. However, with an equally nonlinear load in measurement circuit 50 of FIG. 2, the threshold difference between the devices can be expected to produce a nearly constant output difference voltage.

MOSFETs may also vary in conductivity as well as threshold, and variations in conductivity would appear in the graph of FIG. 5 as a difference of slope. Since conductivity variations may be a function of fixed pattern variations in mask features, it is important to bias the array at low currents so the threshold variations, which are not as mask dependent, can dominate.

Figure 6:
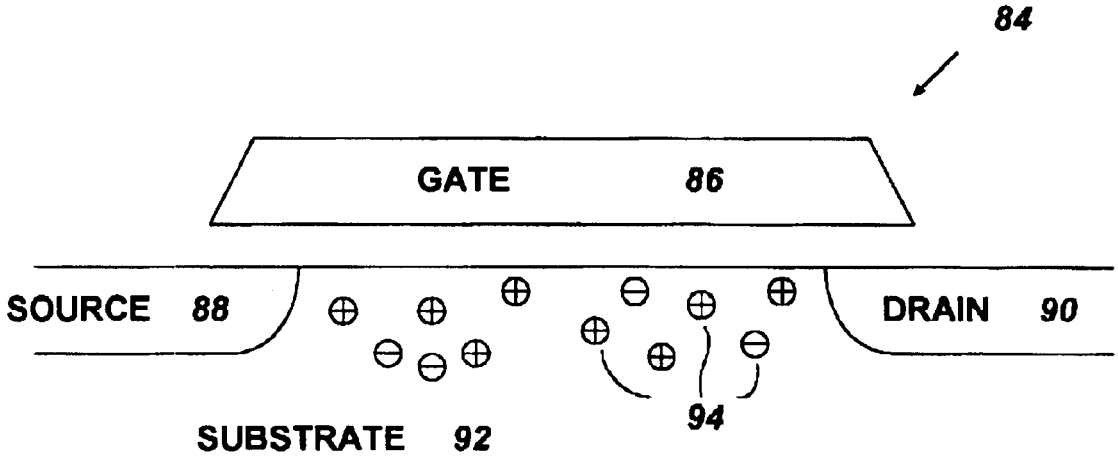
FIG. 6 is a cross section of a MOSFET, illustrating the effect of fixed bulk charges on the MOSFET voltage threshold.

FIG. 6 illustrates a typical MOSFET 84 in simplified cross-section including a gate 86, a source 88, and a drain 90 formed on a substrate 92. The voltage threshold of the MOSFET is typically a weak function of the width and length of the channel and the doping of the gate conductor, and a strong function of the random placement of dopant atoms 94 imbedded in the semiconductor channel material of the substrate under the gate oxide. If the transistor is constructed properly, these dopant atoms are fixed in place, and do not move unless subjected to unusually high electric fields or temperatures. This means that the threshold voltage for an individual MOSFET tends to stay fixed over time, through the threshold voltage will vary from device-to-device due to variation in the position and number of dopant atoms 94 in each transistor channel.

MOSFET threshold mismatch

Figure 7:
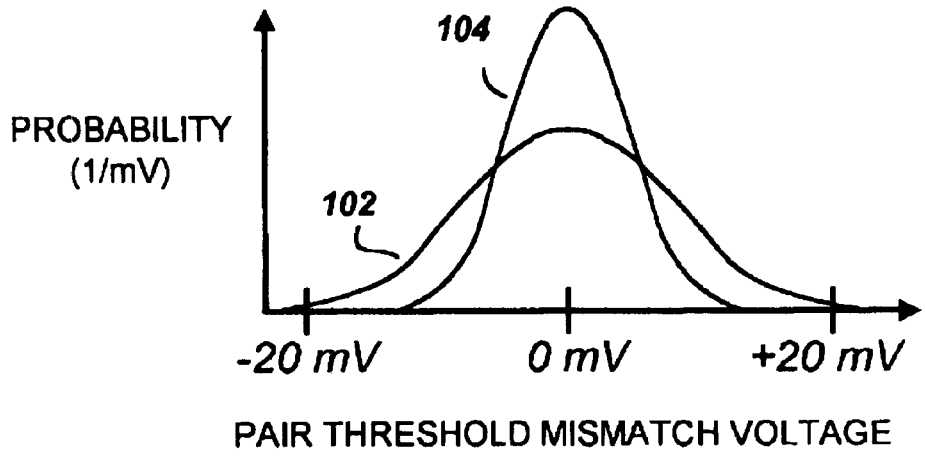
FIG. 7 is a graph illustrating the statistical distribution of threshold voltage mismatches for two different MOS processes.
Figure 8:
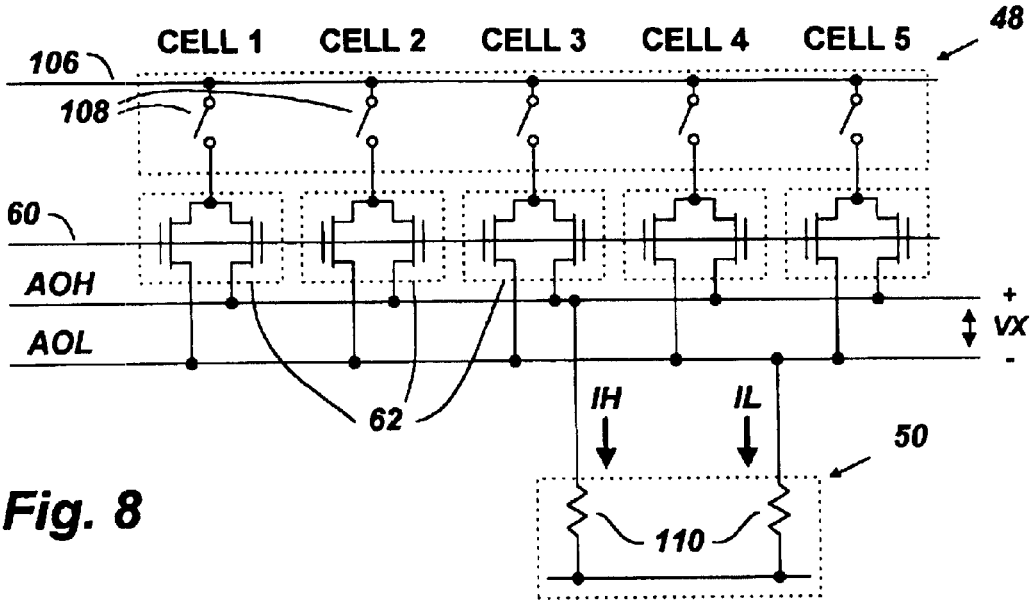
FIG. 8 is a schematic diagram illustrating five individually selectable identification cells connected to a pair of output lines and a pair of load resistors.

When we interconnect pairs of MOSFETs in the manner illustrated in FIG. 4, their threshold voltage mismatch typically produces a difference in their drain currents of approximately one percent of their maximum values when the two MOSFETs 66 and 68 are nominally similar. The drain current mismatch can be divided by the MOSFET transconductance gain to infer the threshold voltage mismatch, which follows a Gaussian statistical distribution. FIG. 7 shows two Gaussian distributions, a narrower distribution 104 for a 0.5 micron effective channel length and a wider distribution 102 for a 0.3 micron effective channel length, based on data from "Experimental Study of Threshold Voltage Fluctuation Due to Statistical Variation of Channel Dopant Number in MOSFETs" by Tomohisa Mizuno et al., IEEE Transactions on Electron Devices, Vol. 41, No. 11, November 1994, pp. 2216–2221, incorporated herein by reference. The paper shows that the variation is independent of distance and uncorrelated between neighboring pairs of devices. The increase in mismatch for shorter channel processes increases the random parametric variation and thus the robustness of identification provided by the ICID circuit. See also "Intrinsic MOSFET Parameter Fluctuations Due to Random Dopant Placement" by Xinghai Tang, et al, IEEE Transactions on Very Large Scale Integration (VLSI) Systems, Vol. 5, No. 4, December 1997, pp. 369–376, also incorporated herein by reference. Sequencing through multiple identification cells FIG. 8 illustrates a single row of cells 62 of array 46 of FIG. 3 sharing a common ROW select bit line 60, and common output lines AOH and AOL, with each separately connected to positive power supply rail 106 through one of a set of source selection switches 108 that are implemented inside stimulus circuit 48 of FIG, 2. The array output lines AOH and AOL are connected to a differential pair of output load resistors 110 representing the input impendance of measurement circuit 50 of FIG. 2. A threshold voltage mismatch in the pairs of MOSFET produces a current mismatch between IH and IL, thereby developing a differential voltage VX across load resistors 110. If the transconductances of the MOSFETs and of the load devices are similar, the circuit will have unity gain; a 10 millivolt threshold mismatch will result in a 10 millivolt differential output voltage. However, mismatches in the load resistors will add a constant voltage offset to the differential voltage VX. The upper MOSFET in each cell is oriented 180 degrees to the lower MOSFET, and has a different geometric center. These two effects produce offset voltage between the devices that may exceed the random mismatch voltage. However, all pairs in the array will have the same orientation and difference in geometric centers, so this too will act as a DC offset to the whole curve, which will disappear if only the step changes are observed.

Figure 9:
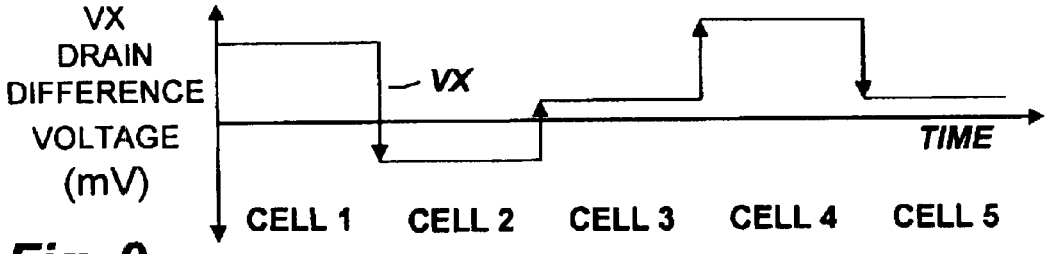
FIG. 9 is a graph of the differential voltage output produced from the five sequentially selected identification cells of FIG. 8.

FIG. 9 plots as a function of time the drain difference voltage VX across resistors 110 resulting from the difference between IH and IL when each of the five cells 62 of FIG. 8 are selected sequentially. Although a load mismatch will shift the whole curve up and down, transitions between the steps tend to remain unaffected. Thus, a more repeatable output ID results when measurement circuit 50 of FIG. 2 bases the value of the output ID on the pattern of transitions between measured voltages for successively selected cells rather than directly on the output voltage levels themselves.

The measurement circuit

Figure 10:
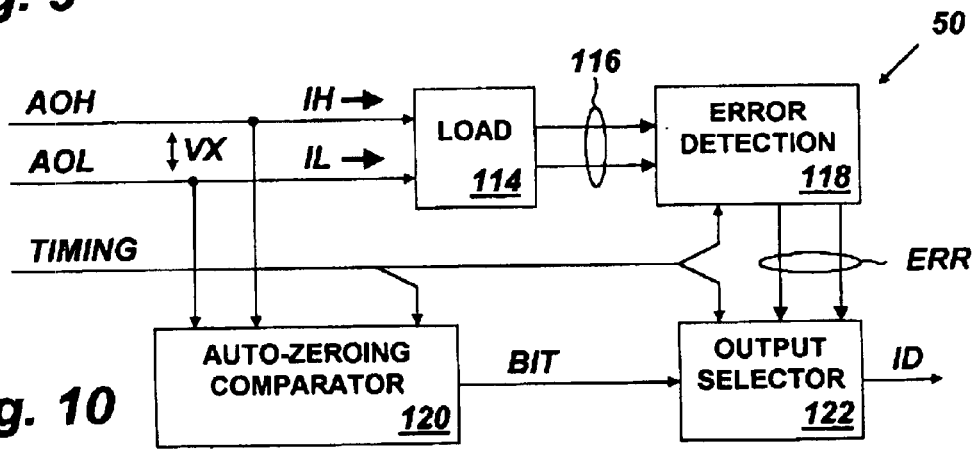
FIG. 10 illustrates the measurement circuit of FIG. 2 in more detailed block diagram form.
Figure 11:
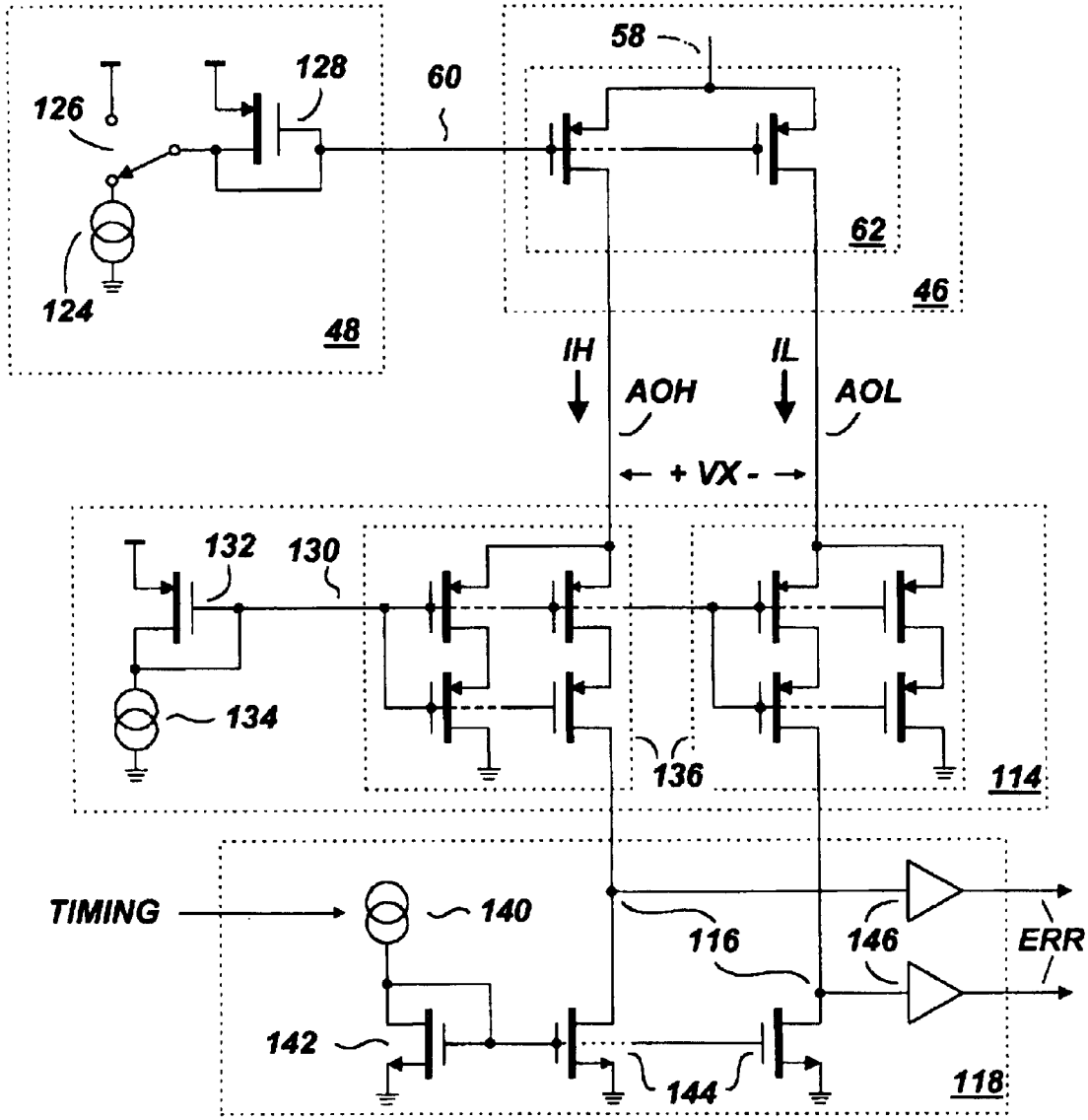
FIG. 11 illustrates the load and error detection portions of the measurement circuit of FIG. 10 in schematic diagram form.

FIG. 10 illustrates measurement circuit 50 of FIG. 2 in more detailed block diagram form. FIG. 11 shows portions of ICID circuit 50, along with relevant portions of array 46 and stimulus circuit 48 in schematic diagram form. Referring to FIGS. 10 and 11, a load circuit 114 convents the currents IH and IL from cell array 46 of FIG. 2 into a cell output voltage VX sensed by an auto-zeroing comparator 120. Auto-zeroing comparator 120 compares the value of the output voltage VX produced by the most recently selected array cell with the value of the VX voltage output of a the previously selected array cell and produces a binary output signal (BIT) indicating which of the two successive VX voltages is higher.

When the ICID circuit is behaving properly, error detection circuit 118 produces a logic zero followed by a logic one on each error output ERR during a portion of every identification period. There are eight clock cycles in an identification period. During four of these clock cycles, the output ID of the output selector 122 is driven by the zero and one from the first error output ERR, then subsequently by the zero and one from the second error output ERR, delayed by two clock cycles. During the other four clock cycles, the output ID is driven by the repeated BIT output of the auto-zeroing comparator 120. Under normal circumstances, the output ID sequence for one identification is "0, 1, 0, 1, BIT, BIT, BIT, BIT". If the error detection circuit detects an error, the "0,1,0,1" output preamble will be different, indicating that the identification may not be trustworthy.

Load and error detection circuits

FIG. 11 is a circuit diagram illustrating various circuit elements in the ICID measurement circuit 50. FIG. 11 also illustrates a portion of stimulus circuit 48 of FIG. 2 that generates the ROW select bit line analog voltage level, along with an example identification array cell 62.

In the stimulus circuit 48, each ROW select line 60 is linked through a diode-connected bias MOSFET 128 to a switch 126, which may further link the line to either a positive rail or to a current source 124. Switch 126 is connected to current source 124 when the row is selected. The current from current source 124 flows through MOSFET 128, causing it to turn on and to produce a low analog voltage on ROW select line 60. If the row is not selected, switch 126 connects ROW select line 60 to the positive rail, turning off all the transistors in the unselected row. MOSFET 128 is suitable made similar to the MOSFETs in each cell 62, so that substantially similar currents to 124 will flow through array output AOH and AOL, and into the load circuit 114.

In the load circuit 114, the IH and IL currents terminate in matching load devices 136. The load devices include series and parallel combinations of P channel MOSFETs, also similar to the MOSFETs in each cell 62. A square array of MOSFETs connected with equal numbers of MOSFETs in series and in parallel will have substantially the same DC behavior as a single MOSFET. However, such an array will have a smaller statistical variation, so the four MOSFETs illustrated as a series-parallel composite in each half of 136 will behave like a single MOSFET, and the pair of composite MOSFETs will behave like a pair of single MOSFETs with improved matching.

P channel MOSFETs are used as load devices because they have substantially the same relationship between transconductance and current as the MOSFETs of the cell, resulting in the same nonlinearities. This means that a mismatch voltage inside a cell will appear substantially the same at the loads and between the array output lines AOH and AOL and will be independent of the current. The output voltage will therefore be relatively resistant to biasing variations, or common mode noise coupled into the system. The relative sizes of the signal steps, and the resulting identification sequence, will be more constant over time.

Load devices 136 act as source followers from the analog load bias voltage 130. The voltage biasing the load is generated from a current 134 across a diode-connected MOSFET 132. The current 134 is eight times the current 124. Thus the voltage on bias line 130 is lower than the voltage on ROW select line 60, and is low enough to ensure that the voltages on the array output lines AOH and AOL are always low enough to keep the MOSFETs in the selected cell 62 in saturation. Although there are many transistors connected in series, in no case is more than one voltage threshold plus a few saturation voltages necessary to bias the circuit for proper operation. As a result, with appropriate reductions in operating current and clocking frequency, the ICID circuit can be operated at very low voltages, barely exceeding the voltage threshold of a MOSFET. While other circuit topologies may be developed offering improved performance with large power supplies, this circuit topology will perform reasonably over a wide range of supplies. In addition, the voltages across the devices minimize such electrical stresses as hot carrier degradation of gate oxides, further protecting the stability of the identification cell array.

Two of the drains from load transistors 136 divert current into the error detection lines 116. The diverted current is connected to the drains of N channel MOSFET current mirrors 144, which mirror the current that current source 140 outputs through diode connected N channel MOSFET 142. If the current mirror MOSFETs 144 produce more current than the error detection lines 116 get from the load devices 136, the lines are pulled low. This causes buffers 146 to produce low logic levels on error outputs ERR. If the load device currents are higher than the current mirrors 144 produce, the error detection lines 116 are pulled high, incidentally modifying the voltages on array output lines AOH and AOL.

Current source 140 is controlled by TIMING signals to produce a sequence of comparison currents. For most of the identification cycle, this current is set at a high value, causing the error detection lines 116 and error outputs ERR to remain low. During one clock period out of the eight clock long identification period, the comparison current 140 is lowered to a value setting an upper threshold level for the array output line current. If AOH or AOL is pulled up too strongly, due to a defect, one of the error detection lines 116 will be pulled high, indicating the defect on one of the error outputs ERR. Otherwise, the error output will stay low during this period. During the subsequent clock period, the current 140 is lowered further to the lower threshold value for the array output line current. Under normal circumstances, this will cause both error detection lines 116 to be pulled high. However, an array defect may cause either AOH or AOL to pull up too weakly, and one or both of the error detection lines 116 will remain erroneously low. Thus, if the IH and IL currents are within an appropriate range, we will see a logic zero followed by a logic one on each of the error outputs ERR.

A defect in the array causing more than one row or column to be selected, or one of the identification transistors to be egregiously large, will thus cause two logic ones on one of the error outputs ERR. If no rows or columns are being selected, or there is an open in a MOSFET or an interconnection device, we will see two logic zeros. Defects may arise from decoding or logical errors in the address sequencer. Whatever the source of error, most of them may be detected and isolated by observing the error output lines ERR for the correct sequence of pulses. Error detection circuit 118 thus adds to the trustworthiness of the ICID circuit, though due to the small size of the ICID circuit the chances of its encountering any defect at all is quite small, perhaps 100 parts per million.

Auto-zeroing comparator

Figure 12:
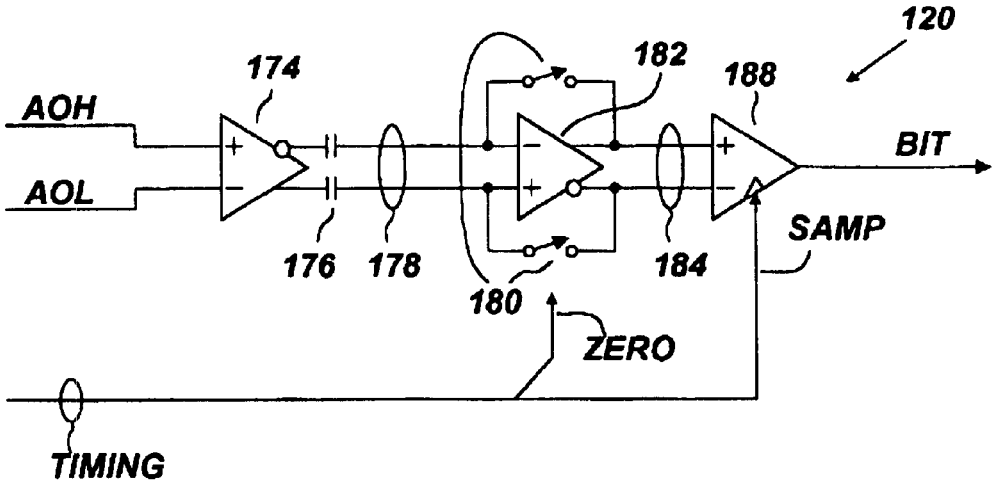
FIG. 12 illustrates the auto-zeroing comparator of FIG. 10 in schematic diagram form.
Figure 13:
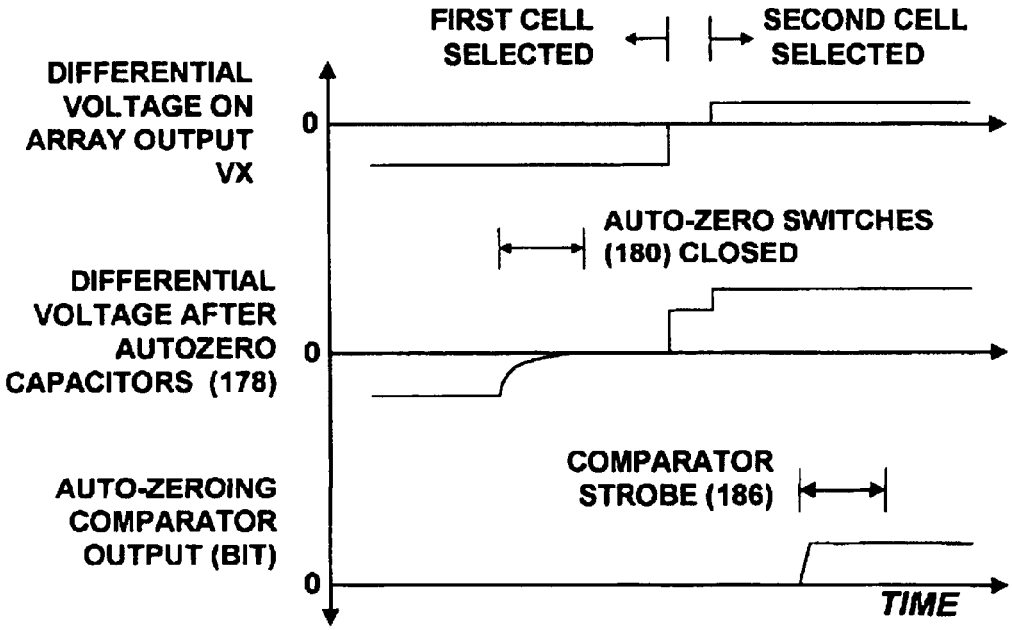
FIG. 13 is a timing diagram illustrating behavior of signals in the auto-zeroing comparator of FIG. 12.

FIG. 12 illustrates a suitable implementation of the auto-zeroing comparator 120 of FIG. 10. Comparator 120 includes two limited-gain amplifiers 174 and 182 for amplifying the array output voltage VX on array output lines AOH and AOL, and a strobed comparator 188 for converting the analog difference into a binary output on line BIT. Comparator 188 is strobed by a timing control signal (SAMP) from stimulus circuit 48 of FIG. 2. Amplifiers 174 and 182 have voltage gains of approximately five, giving them relatively high bandwidth and making them insensitive to process variation. Amplifiers 174 and 182 are suitably constructed with large transistors arrayed in common centroid geometries to minimize voltage offsets and to maximize power supply noise rejection. The first amplifier 174 is coupled to amplifier 182 through coupling capacitors 176. Switches 180, controlled by control signal ZERO from stimulus circuit 48, auto-zero these capacitors.

Auto-zeroing capacitor 120 measures the size of the differential voltage change between two successive values of VX produced by successively selected identification cells. Amplifier 174 amplifies and inverts VX to drive the front end of coupling capacitors 176. The output of capacitors 176 drives the differential line pair 178, the input to amplifier 182. During the autozero portion of the identification period, switches 180 are closed, connecting the output of the second amplifier stage 182 back to its inverted input. This results in forcing the differential line pair 178 to a small difference voltage, approximately the residual input offset of second amplifier 182, and independent of the voltage on amplifier 174. A voltage is impressed across the capacitors 176 equal to the array output voltage VX as amplified by the first amplifier 174. Switches 180 are then opened, and the voltage at nodes 178 remains small. Subsequently, a second identification cell is selected. This produces a new voltage VX on array output lines AOH and AOL, which is amplified by the first amplifier 174 to change the voltage at the input side of the capacitors 176. Because the capacitor outputs 178 have been disconnected by the switches, they are free to follow the change of voltage on their input side, causing the differential voltage on lines 178 to change from their pre-charged value to a new value proportional to the change in VX multiplied by the gain of the first amplifier stage 174. This change is further amplified by the gain of the second stage amplifier 182, to produce a greatly amplified voltage change on the strobed comparator inputs 184.

After the voltage step has settled on lines 184, the comparator 188 is stored with comparator timing strobe SAMP. This causes the comparator to resolve the positive or negative voltage change into a logic one or zero on comparator output line BIT. Additional switches and control signals may be added to the auto-zeroing comparator circuit to enhance its performance. In particular, large voltage glitches at the input may occur when switching from one identification cell to the next, and switched clamps may help the comparator settle after these large voltage glitches.

The stimulus circuit

Figure 14:
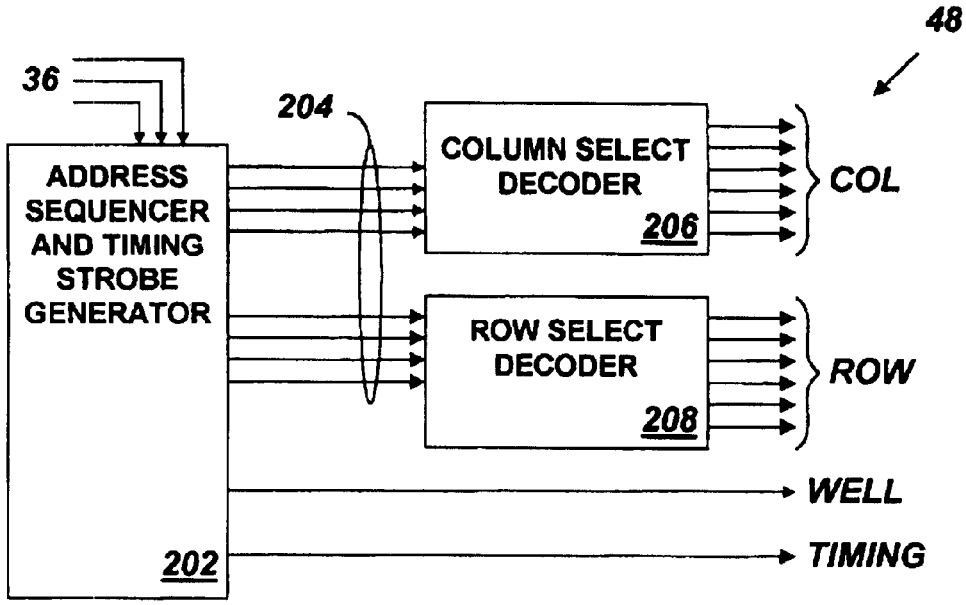
FIG. 14 illustrates the stimulus circuit of FIG. 2 in more detailed block diagram form.

FIG. 14 illustrates stimulus circuit 48 of FIG. 2 in more detailed block diagram form. Stimulus circuit 48 responds to input data and control signals 36 by supplying the appropriate ROW and COL selects to sequentially select and stimulate the cells in the identification array 46, and by generating the TIMING strobes for controlling the measurement circuit 50. Stimulus circuit 48 includes a conventional sequencer 202 for providing output binary addresses and a pair of decoders 206 and 208 for decoding those addresses to produce the ROW and COL selects supplied to the cell array. Stimulus circuit also provides the N-Well bias control signal WELL.

Figure 15:
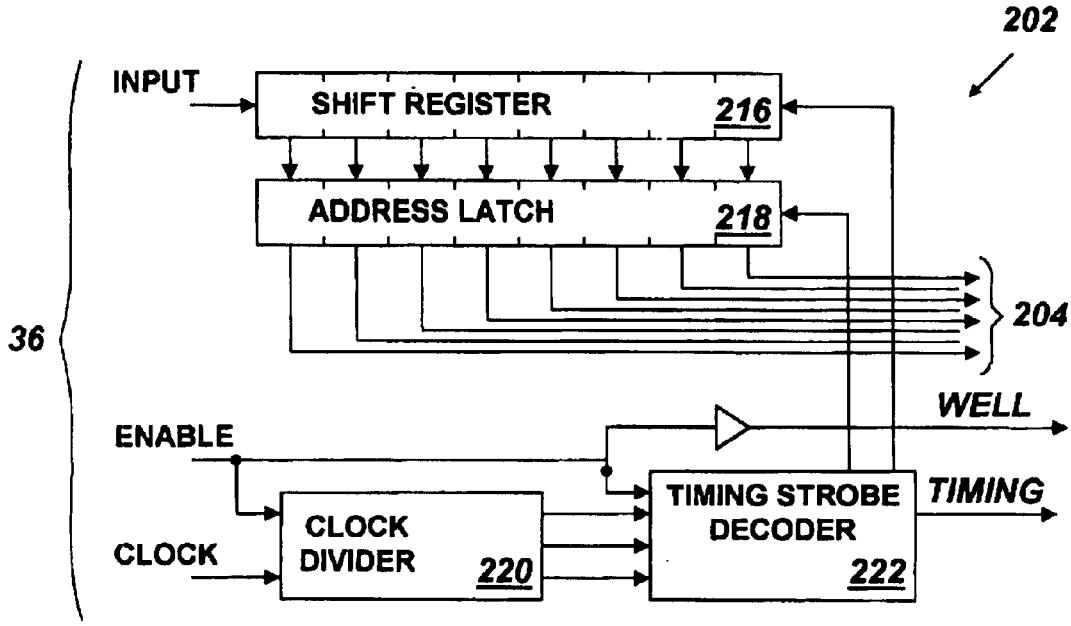
FIG. 15 illustrates the address sequencer and timing strobe generator of FIG. 14 ;in schematic diagram form.

FIG. 15 illustrates a suitable implementation of sequencer 202 of FIG. 14. In this implementation, row and column addresses are generated outside the ICID circuit by circuits that may be within or external to IC 40 of FIG. 1. These addresses are serially shifted into a shift register 216 via an INPUT of the control inputs 36. When an address is has been shifted into register 216, it is written into a latch 218 and used to address the cell array via decoders 206 and 208 of FIG. 14. Sequencer 202 includes a clock divider 220 for frequency dividing a CLOCK line of the control inputs 36 by a factor of eight to produce a binary count applied as input to a timing strobe decoder 222. Decoder 222 produces TIMING strobes for shift register 216 and address latch 218 as well as the TIMING strobes needed to control event timing in the measurement circuit 50 of FIG. 2. An ENABLE line of control inputs 36 is driven high to enable the clock divider 220 and strobe decoder 222 to initiate the measurement process. The control inputs 36 to sequencer 202 may suitably be a provided by a conventional JTAG bus driven by a conventional address counter and clock when the controller is external to the IC.

Circuit Timing

Figure 16:
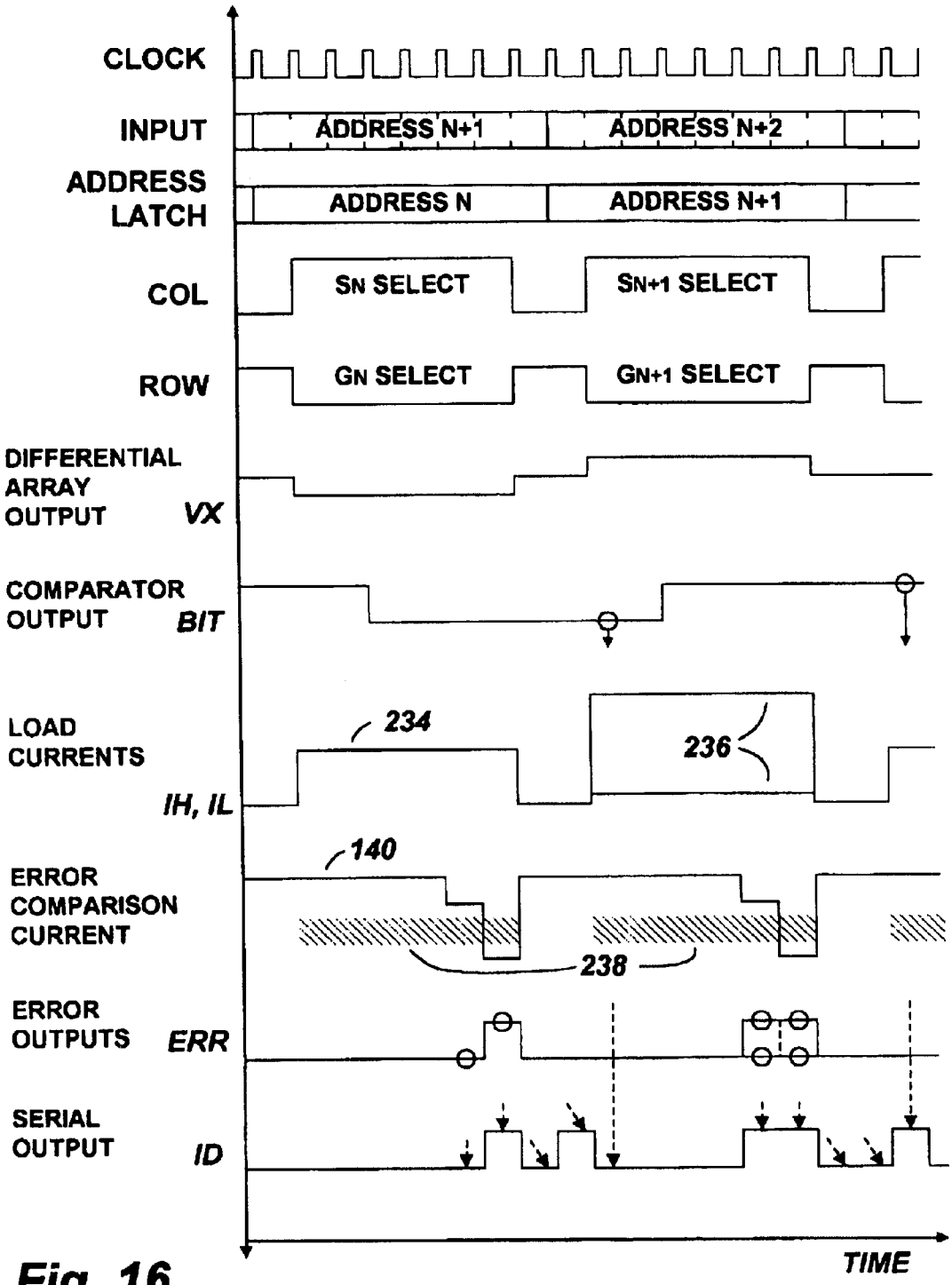
FIG. 16 is a timing illustrating waveforms in the ICID circuit of FIG. 2.

FIG. 16 illustrates timing of various signals of the ICID circuit illustrated in FIGS. 2, 10, 11, and 15. The top waveform illustrates the periodic behavior of the input control signal CLOCK. All activities are suitably gated off the rising edge of this clock, though the opposite edge or both edges may be used. INPUT data is captured into the input shift register 216 parallel loaded into address latch 218 once every eight clocks. An address latch 218 is strobed eight clock times after the appearance of the first bit of the address on the INPUT. The eight clock "identification period" may be longer when array 46 of FIG. 3 requires more address bits.

Four bits of the latched address are decoded into one of 16 COL select lines 58. The other four bits of the latched address are decoded into one of 16 ROW select lines 60. The COL select lines 58 are asserted positive, while the ROW select lines 60 are asserted negative. For an interval around the address transition, all the COL select lines 58 are precharged low, and all the ROW select lines 60 are precharged high. These de-selects all the identification cells in the identification cell array 46. During the same precharge interval, the disconnected array output lines AOH and AOL are precharged high. When the row and column lines are asserted, one of the identification cells is selected, and the array output lines AOH and AOL change to values reflecting the difference voltage. The voltage change is measured by the auto-zeroing comparator in the measurement circuit, producing the comparator output BIT. The differential array output AOH and AOL will normally produce mid-range load currents as shown during the first segment 234 of the load current waveform. However, a defect may cause either no identification cells to be selected, as illustrated by the lower line of second segment 226, or two identification cells to be selected, as illustrated in the upper line of segment 236. This will cause the current through at least one side of the load cell 114 to be abnormally low or high. This current is compared in the load cell to the error comparison current 140, with the normal range of currents shown by the regions 238.

With the error comparison current as illustrated by waveform 140, we can expect normal cells to produce a zero error output until the last clock period of the selected cycle, when the comparison current 140 is reduced below the minimum expected current to produce a one pulse on the error outputs ERR. However, an excessive current will result in the error outputs ERR pulsing high for both comparisons, and an insufficient current will result in no pulse at all. These errors could all be logically combined into a single logical signal, but in this case, all four error signals are separately multiplexed into the ICID circuit output stream ID by the output selector 122. This is done by delaying the signal from one of the pair of error outputs ERR by two clock periods before multiplexing it into the output stream, while multiplexing the signal from the other line into the output stream directly. By examining the serial bit stream, the validity of the serial output stream can be determined. This is important when the identification portion of the output stream cannot be validated with a checksum or other validating data pattern.

Type Identification

Figures 17, 18:
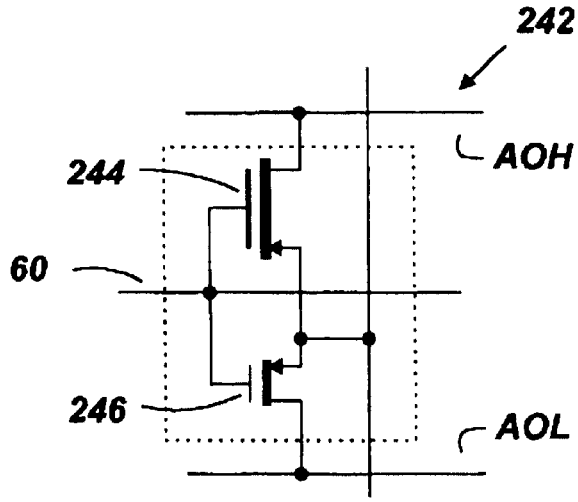
FIG. 17 illustrates a type identification cell in schematic diagram form.
FIG. 18 is a pair of tables illustrating the formation of a sorted identification record.

ICID 38 may be adapted to provide an output ID that not only uniquely identifies an IC in which it is installed but also includes a "type code" indicating aspects of the IC that is has in common with other ICs sharing the same photomask, such as its type, source of manufacture, etc. Thus an output ID of ICID 38 would include one field having a value that is unique to the IC in which it is installed and another field having a value that is common to all similar ICs. The type code may be set by replacing each of several of the "random identification" cells 62 of array 46 of FIG. 3 with "type identification" cell 242 similar to that illustrated in FIG. 17, or by adding additional type identification cells to the array. Type identification cell 242 of FIG. 17 is generally similar to the random identification cell 62 of FIG. 4 in construction and operation except that the type identification cell has upper and lower MOSFETs 244 and 246 differing substantially in size so that in each type identification cell one MOSFET will always be stronger than the other despite random parametric variations. A "logic 1" type identification cell 242 as illustrated in FIG. 17, where the upper MOSFET 244 is larger than the lower MOSFET 246 will always produce a larger drain current in its upper drain output line than in its lower drain line, and so will always produce a "positive" output voltage VX when selected. Conversely, a "logic 0" type identification cell having a smaller upper MOSFET and a larger lower MOSFET will produce a negative output voltage VX. When a series of logic 1 and logic 0 type identification cells are addressed in appropriate sequence, they produce a predictable sequence of ones and zeros in the output ID that may be used to identify the IC's type. Any error in the type identification sequence will provide an identification of defects in the IC array.

Identity records

The sequence in which the array cells are addressed influences the nature and value of the ID the ICID circuit 38 produces. Four kinds of IDs will be described, but many other kinds may be readily imagined and this invention is not limited to those described here. The simplest ID is the binary ID generated by counting linearly through all array addresses in sequence, and saving the result of the comparison as a binary bit. The address count proceeds as 0,1, 2, . . . , N-1, N and wraps around to 0 again. The serial output bits ID from the measurement circuit directly form the 256 binary bit identity record.

This simple sequence may be modified slightly to better accommodate type identification cells. Sequencing from a logic one-type to logic zero-type identification cell will always produce a deterministic "0" bit out of the auto-zero comparator. Sequencing from a zero-type to a one-type identification will always produce a deterministic "1". However, sequencing between two zero-type or two one-type cells will produce a non-deterministic "mismatch" transition, useful for individual part identification, but not for type identification. Therefore, arrays with rows of type identification cells may alternately be addressed with a sequence like: 0, M, 0, M+1, 0, M+2, . . . where the type identification cells are M, M+1, and so on. This means that the first part of the bit sequence forming the output ID will have a predictable string of bits representing the type identification.

FIG. 18 illustrates a "sorted value" ID, which sorts the ICID cell address in ascending order of measured cell parametric value. The address of the cell having the most negative parametric value becomes table entry zero. The address of the cell having the next most negative parametric value goes into table entry one. At the end of the process, an ICID circuit with N cells will produce a table of N integers, each integer representing an array address.

FIG. 18 shows two tables, each listing cell locations and associated parametric values. The first table 254 illustrates cell parametric values that might be found in a simplified eight cell ICID. A simple binary ID for these cell parametric values would be 00110111, the result of comparing the parametric value in each cell with the parametric value of the subsequent cell. The second table 256 shows the result of sorting the cells in ascending order of parametric value. The cell parametric values are in sequence, and addressing the array in the sorted order would produce a sequence of ones, if all the values were unique. However, the illustrated array has two cells with the same value, and the result of comparing those two cells will be indeterminate, and the comparator output could be either one or zero.

The actual parametric values are not directly visible to a sorting process; however, all that is readily needed for a sort is the ability to compare values, and this comparison is performed by the auto-zeroing comparator 120. A conventional sorting algorithm, implemented as hardware on an IC, or as software running on an external tester or comparator, may be used to perform the sorting. The sequence of sorted addresses conveys more information than the simple binary ID. A binary ID for the simplified array illustrated can have 2 to 8th power or 256 possible values, while the sorted ID can have 8 factorial or 40320 possible values. Both ID records may be extracted from the very same ICID circuit, simply by using different control sequences and different algorithms.

The sorted value ID may be used in its entirety, but a shorter subset of "reliable" values may be constructed. When a sequence of these reliable values are presented to the ICID circuit, it will tend to produce a more repeatable series of transitions and comparator outputs. This sequence may be used to query the ICID circuit and receive a deterministic response.

Binary ID Analysis

Due to noise and drift, the output of a cell, which happens to nearly match the previously selected cell, may randomly resolve into either a one or a zero whenever the two cells are sequentially addressed. This will make some of the bits of an ID non-repeatable, and slightly different every time it is generated. However if the ID is sufficiently long, the remaining invariant bits will still serve to identify the IC that generated it since it would be unlikely that an ID produced by any other IC would have so many bits in common.

FIG. 19 shows the rate at which bits change value—the bit error rate—as a function of threshold mismatch drift, for a binary ID. A clean, modern CMOS process will have drifts of less than 10 percent of the standard deviation of voltage threshold mismatch, while the bit error rate is only 25% for drift equal to 100% of the standard deviation of voltage threshold mismatch. The bit error rate will be greater than zero for any amount of drift, but it will stay small for reasonable drift. The fraction of bits changed, or the bit error rate, is called P. The graph P (262) asymptotically approaches 0.5 as the drift approaches infinity. Two binary IDs can be compared by computing the absolute norm between them. The absolute norm is defined as the count of the number of bits that differ between the two IDs. If two IDs are identical, they have an absolute norm of zero. If every bit is different, that is, one ID is the inverse of the other, the absolute norm is equal to N, the number of bits in the ID. The absolute norm between two different IDs generated from different arrays will have an average of N/2. A histogram of the values will follow a Gaussian curve centered around N/2, with a standard deviation of $\underline{O}$N/2. If a 256 bit binary IDs compared to a file containing one trillion different IDs, that is likely to be less than one difference with absolute norm less than 73 and less than one difference with an absolute norm greater than 183, with most differences clustering between 120 and 136, and an average absolute norm of 128.

When a binary ID is extracted from an ICID circuit with subsequent drift, perhaps due to random noise, mobile ion contamination, or redistribution of the charges in the transistor channel, the ID may change over time. The bit extraction process is resistant to these changes. If a random drift of 25% (an additional uncorrelated Gaussian with 25% of the magnitude of the original Gaussian) is added to the random values used to produce the binary identity record, the result will be about 7.8% of the bits randomly changing value. The bit error rates are statistically independent for each bit. The average absolute norm, for a given array size and bit error rate, is N'P. For the example with 256 values, 25% drift and P=0.078, the average absolute norm will be about 20. For a trillion drifting samples, there will be less than one part with an absolute norm greater than 56.

FIG. 20 shows the expected probabilities from comparing one binary ID to a database of one trillion 256 bit IDs. A logarithmic vertical scale is used in order to magnify extremely tiny probabilities. If the ID has been extracted from a component that has drifted 25% since its original identification, it will nearly match its original ID with an absolute norm of less than 56, with a chance of less than one part in a trillion of exceeding this value. The absolute norm will most likely be around 20, and follow the probability distribution shown as the matching curve 264. When compared to all the other IDs in the data base for different ICID circuits, another distribution is formed, following the mismatch curve 266. There is less than one character in a trillion that the absolute norm for a different ID will be less than 73, and the average absolute norm will be around 128.

The false positive and false negative rates will not be mathematically zero, but they will be immeasurably small when the array is sufficiently large, certainly better than fingerprint identification and other legally acceptable forms of identification. The ICID circuit may be practically applied to identify one part out of a database of one million parts. The IDs of one million parts are extracted, along with other identifying information such as testing date, lot number, wafer number, wafer position, process parameters, test speed, and other useful information. This information may be stored in a computer database. Assume at some later time, with the one million parts in use, that one of these parts needs to be identified. An ID is extracted from the identification circuit on the chip. Because of drift, this ID will probably not be identical to the original ID in the data base. However, if it is compared to every ID in the data base, the result will be 999,999 absolute norms that are probably greater than 90, and almost certainly greater than 73. There will also be a single absolute norm that is probably less than 44, and almost certainly less than 53, if the drift is less than 25%. We can set a threshold in our test of 64, and easily distinguish the correct ID in the data base. In fact, the drift can be as high as 37% before there is more than one chance in a trillion of exceeding the threshold, and erroneously concluding the selected component is not in the database because of excessive drift. Modern semiconductor processes drift far less than this.

If the part is not in the database with an absolute norm of less than 64, the component has either been badly mistreated, it has not been logged, the identification circuit has failed, or the component is a counterfeit produced by some other manufacturer. All of these possibilities can be distinguished with further investigation, and all are of interest to a semiconductor manufacturer. A 256-cell array was employed in the example ICID illustrated herein. However with a lesser maximum drift, or when fewer chips are to be identified, or when the identification may be less reliable, than fewer array cells may be used. For example, with a 10% maximum drift, and a 1 in 1 million allowable error rate, as few as 64 cells will provide adequate identification. For a 1 in 1 quadrillion error rate (10–15) and a drift of 240%, 4096 cells may be needed. For any finite drift, an acceptable error rate may be achieved with a sufficient number of cells.

Cell Array Alternatives

The discussion hereinabove assumed that array cells were implemented in an N-Well CMOS process of 0.5 micron or smaller linewidth, but cell transistors may be either N channel or P channel MOSFETs, and longer channel processes may be used in some circumstances. If the CMOS process is an N-Well process, P channel MOSFETs should be chosen so that the entire array can be placed in an N-Well isolated from the substrate and the electronic noise in it. A P-Well process would use N channel MOSFETs for the same reason. While the preferred embodiment of the invention employs MOSFET pairs with common source and gate connections, with the output signals derived from the drains, it is also possible to connect transistors with common gate and drain, thereby deriving a voltage difference signal from the source. While the array cells of the preferred embodiment make use of the voltage threshold mismatch of a pair of MOSFETs, mismatches of length, width, oxide thickness, or any other parametric variables may be used in alternative embodiments of the invention. Pairs of devices are used for the preferred embodiment, but single devices may be used in applications where the ambient conditions permit it. Resistor mismatches or VBE mismatches could be used with a purely bipolar process. Identification from random parametric variation can be applied to any other semiconductor process producing devices with random but repeatable parametric mismatches.

Although the device array was illustrated as a square, equally useful ICID circuits may be constructed as a rectangular array of any shape or size. To improve statistical usefulness, it is helpful to include the set of "dummy cells" at the edges of the array which are not addressed when an ID is generated. However the such dummy cells along the array edges may be omitted. Row select transistors may be added to isolate the array output lines AOH and AOL from unselected drains. With proper addressing, this allows merging of drain output lines between rows of cells, allowing for a more compact array.

Operational Alternatives

The ICID circuit may be addressed, for example, by a counter, rather than a shift register, generating addresses internally rather than from an input line. The external clock may also be replaced with a free-running oscillator. The enable input may be replaced with a power-on reset cell. Such an alternative design would have a single output line, and be suitable for applications where interconnect count is more important than power or synchronization.

When an ID is computed, it may be stored on the chip itself as a sequence of values in an on-chip Random Access Memory (RAM) which may be non-nonvolatile. The RAM may be part of a microprocessor on-board cache, and available to software executed by that microprocessor. This arrangement allows fast access to the ID during use, and may be required to generate repeatable IDs in very noisy environments. It does, however, require additional chip area for a RAM.

I claim:

1. An apparatus (ICID) installed on an integrated circuit (IC) for generating an identification number (ID) identifying the IC in which it is installed, the apparatus comprising:

a plurality of identification cells formed within said IC, each having an output that is a substantial function of random parametric variations in said IC; and measurement means for monitoring the output of said plurality of identification cells and for generating said ID in response thereto, wherein said ID is also a substantial function of random parametric variations in said cells.

2. The apparatus in accordance with claim 1 wherein said measurement means establishes a value of said ID in accordance with the output of each of said plurality of identification cells.

3. The apparatus in accordance with claim 2 wherein each of said identification cells comprises at least one transistor, and wherein the output of each cell is a function of an operating characteristic of that transistor that is in turn a function of said random parametric variations in said IC.

4. The apparatus in accordance with claim 2 wherein each of said identification cells comprises two transistors having a difference in operating characteristics resulting from said random parametric variations in said IC, and wherein said output of said cell is a function of said difference in operating characteristics.

5. The apparatus in accordance with claim 4 wherein said transistors are metal oxide semiconductor field effect transistors (MOSFETs).

6. The apparatus in accordance with claim 2 further comprising a plurality of type cells formed within said IC, each type cell having an output that is substantially independent of said random parametric variations, wherein said measurement means also monitors the output of each of said plurality of type cells and also generates said ID in response to said output of each of said plurality of said type cells.

7. The apparatus in accordance with claim 6 wherein said ID generated by said measurement means includes a first field reflecting a pattern of monitored outputs of said plurality of identification cells and a second field reflecting a pattern of monitored outputs of said plurality of type cells.

8. The apparatus in accordance with claim 1 wherein said measurement means comprises:

means for sequentially comparing magnitudes of monitored outputs of said identification cells and for generating a sequence of bits, each bit of said sequence indicating a result of a comparator of outputs of said identification cells; and means for generating said ID in response to said sequence of bits.

9. The apparatus in accordance with claim 1 wherein the output of each of said cells comprises two output signals that are functions of said random parametric variations, and wherein said output monitored by said measurement means comprises a difference between said two output signals.

10. The apparatus in accordance with claim 9 wherein said measurement means comprises:

means for performing comparisons of said differences between output signals of successive ones of said identification cells and for generating a sequence of bits, each bit of said sequence indicating a result of a separate one of said comparisons; and means for generating said ID In response to said sequence of bits.

11. A method for providing an integrated circuit (IC) with an identification number (ID), the method comprising the steps of:

forming a plurality of identification cells within said IC, each having an output that is a substantial function of random parametric variations in said IC; and generating said ID in response to the output of each cell, wherein said ID is also a substantial function of random parametric variations in said IC.

12. The method in accordance with claim 11 wherein a value of said ID is established in response to the output of each of said plurality of identification cells.

13. The method in accordance with claim 12 wherein each of said identification cells comprises at least one transistor, and wherein said output is a function of an operating characteristic of that transistor that is in turn a function of said random parametric variations in said IC.

14. The method in accordance with claim 12 wherein each of said identification cells comprises two transistors having a difference in operating characteristics resulting from said random variations in said IC, and wherein said output is a function of said difference between said operating characteristics of said transistors.

15. The method in accordance with claim 14 wherein said transistors are metal oxide semiconductor field effect transistors (MOSFETs).

16. The method in accordance with claim 11 wherein the step of generating said ID in response to the outputs comprises the substeps of:

performing comparisons of the outputs of pairs of said identification cells;

generating a sequence of bits, each bit of said sequence indicating a result of a separate one of said comparisons; and generating said ID in response to said sequence of bits.

17. The method in accordance with claim 11 wherein each of said cells produces two output signals that are functions of said random parametric variations, and wherein said output of each cell comprises a difference between said two output signals.

18. The method in accordance with claim 17 wherein the step of generating said ID in response to the output comprises the substeps of:

performing comparisons of the outputs of pairs of said identification cells;

generating a sequence of bits, each bit of said sequence indicating a result of a separate one of said comparisons; and generating said ID in response to said sequence of bits.

19. A method for providing an integrated circuit (IC) with an identification number (ID), the method comprising the steps of:

forming a plurality of identification cells within said IC, each having an output that is substantially a function of random parametric variations in said IC;

forming a plurality of type cells within said IC, each type cell having an output that is substantially independent of said random parametric variations, and generating said ID in response to a combination of the outputs of said plurality of identification cells and said plurality of type cells, wherein a value of said ID is established in accordance with the outputs of said plurality of identification cells and said plurality of type cells, and wherein said value is substantially a function of random parametric variations in said IC.

20. The method in accordance with claim 19 wherein the generated ID includes a first field reflecting a pattern of the outputs of said plurality of identification cells and a second field reflecting a pattern of the outputs of said plurality of type cells.

*21. An apparatus in an integrated circuit (IC) for generating an identification number (ID) identifying the IC, the apparatus comprising:*

*an identification circuit formed within the IC, the identification circuit outputting signals that are a substantial function of random parametric variations in the IC; and*

*a measurement circuit, the measurement circuit receiving the signals that are a substantial function of random parametric variations in the IC, wherein the measurement circuit generates the ID, wherein the ID is a substantial function of the random parametric variations.*

*22. A method for providing an integrated circuit (IC) with an identification number (ID), the method comprising the steps of:*

*forming an identification circuit within the IC, the identification circuit outputting signals that are a substantial function of random parametric variations in the IC; and*

*generating the ID in response to the signals that are a substantial function of random parametric variations in the IC, wherein the ID is a substantial function of the random parametric variations.*

*23. A method for providing an integrated circuit (IC) with an identification number (ID), the method comprising the steps of:*

*forming an identification circuit within the IC, the identification circuit outputting signals that are substantially a function of random parametric variations in the IC;*

*forming a common value circuit within the IC, the common value circuit having an output that is substantially independent of the random parametric variations; and*

*generating the ID in response to the outputs of the identification circuit and the common value circuit, wherein the ID is substantially a function of the random parametric variations in the IC.*

*24. A method for identifying an integrated circuit (IC), the method comprising the steps of:*

*manufacturing the IC as a batch process, wherein the IC is manufactured as one of a plurality of ICs by the batch process, wherein each of the ICs includes a plurality of identification cells each having an output that is a substantial function of random parametric variations in the particular IC; and*

*generating and identification number (ID) for each of the plurality of ICs, wherein the ID for the IC identifies the IC and distinguishes the IC from the other ICs of the plurality of ICs, wherein each of the IDs is a substantial*

*function of random parametric variations in each corresponding IC.*

*25. The method of claim 24, wherein the IDs for each of the plurality of ICs are logged after generation.*

*26. The method of claim 25, wherein the IDs are logged in a database.*

*27. The method of claim 24, wherein the IDs are generated during a test procedure for the ICs.*

*28. The method of claim 27, wherein the IDs are generated via an IC tester.*

*29. The method of claim 24, wherein the plurality of identification cells are formed as separate cells.*

*30. The method of claim 24, wherein the plurality of ICs are manufactured using identical masks, wherein a unique ID is provided for each of the plurality of ICs.*

*31. The method of claim 30, wherein the ID for the IC is used to track the IC and distinguish it from the other of the plurality of ICs.*

*32. The method of claim 24, wherein the plurality of identification cells are formed in the IC as an array.*

*33. The method of claim 32, wherein the array is accessed to generate the ID for the IC based on signals including row and column signals that are applied to the array.*

*34. The method of claim 32, wherein a plurality of dummy identification cells are formed at an edge of the array, wherein the dummy identification cells are not used to generate the ID.*

*35. The method of claim 24, wherein voltages are applied to the plurality of identification cells to disable the identification cells at a time when the identification cells are not being used to generate the ID.*

*36. The method of claim 35, wherein the applied voltages serve to reduce electrical stress on the identification cells when the identification cells are not being used to generate the ID.*

*37. The method of claim 24, wherein the parametric variations are based on mismatches of voltage threshold, transistor length, transistor width, dielectric thickness or other parametric variables in the manufacturing process for the IC.*

*38. The method of claim 24, wherein the plurality of identification cells are provided in a number that is determined based on a total number of ICs to be identified.*

*39. The method of claim 38, wherein the number also is determined based on a drift factor for the manufacturing process used to manufacture the IC.*

*40. The method of claim 38, wherein the number is determined so as to provide an ID of a desired degree of probability.*

*41. The method of claim 24, wherein the IC is employed in a system, wherein the system is operated, wherein the generated ID is used: to track a source of manufacturing; to identify the system employing the IC; to validate a transaction; to route a message; to track an item through customs; to verify a royalty; to recover a stolen good; or to validate software.*

*42. The method of claim 24, wherein the plurality of identification cells are accessed via signals provided internal to the IC.*

*43. The method of claim 24, wherein the plurality of identification cells are accessed via signals provided external to the IC.*

*44. The method of claim 24, wherein the ID is generated by accessing at least certain of the plurality of identification cells in a predetermined sequence.*

*45. The method of claim 44, wherein the predetermined sequence comprises a linear sequence.*

*46. The method of claim 44, wherein the plurality of identification cells are selectively accessed based on a previous measurement of a parametric value associated with particular identification cells.*

*47. The method of claim 46, wherein the plurality of identification cells are selectively accessed to generate a deterministic ID.*

*48. The method of claim 24, wherein the IC also includes one or more cells outputting a predetermined code that is common to a plurality of ICs.*

*49. The method of claim 48, wherein the predetermined code comprises a code that identifies a characteristic of the plurality of ICs or a source of manufacture of the plurality of ICs.*

*50. The method of claim 48, wherein the one or more cells outputting the predetermined code generate the predetermined code based on circuitry that is common with circuitry that generates the ID.*

*51. The method of claim 48, wherein the one or more cells outputting the predetermined code and at least certain of the plurality of identification cells are accessed in a mixed manner to output the predetermined code and to generate the ID.*

*52. The method of claim 24, wherein the ID is generated as a string of bits, wherein one or more bits are indicative of possible errors in the generation of the ID.*

*53. The method of claim 24, wherein the ID is generated based upon a sequence of voltage transitions.*

*54. The method of claim 24, wherein the ID is generated in a unique manner for the particular IC, wherein the manufacturing process for the IC does not require custom process steps or custom circuitry to generate the ID.*

*55. The method of claim 24, wherein the generated ID is stored in a memory.*

*56. The method of claim 55, wherein the memory is accessible by a CPU.*

*57. The method of claim 56, wherein software executed by the CPU makes available the generated ID stored in the memory.*

*58. The method of claim 57, wherein the memory comprises a CPU cache memory.*

*59. The method of claim 55, wherein the memory comprises a non-volatile memory.*

*60. A method for generating an identification number (ID), the method comprising the steps of:*

*selectively operating an identification circuit within an integrated circuit (IC), wherein the identification circuit provides an output that is a substantial function of random parametric variations in the IC, wherein an ID for the IC is generated based on the output, wherein the ID for the IC is a substantial function of random parametric variations in the IC; and*

*recording the ID, wherein the IC may be identified based on the recorded ID.*

*61. The method of claim 60, wherein an ID for each of a plurality of ICs is generated and logged in a database.*

*62. The method of claim 61, wherein the IDs are generated during a test procedure for the ICs.*

*63. The method of claim 62, wherein the IDs are generated via an IC tester.*

*64. The method of claim 60, wherein the identification circuit comprises a plurality of identification cells.*

*65. The method of claim 64, wherein the plurality of identification cells are formed in the IC as an array.*

*66. The method of claim 65, wherein the array is accessed to generate the ID for the IC based on signals including row and column signals that are applied to the array.*

*67. The method of claim 65, wherein a plurality of dummy identification cells are formed at an edge of the array, wherein the dummy identification cells are not used to generate the ID.*

*68. The method of claim 60, wherein the IC is one of a plurality of ICs that are manufactured using identical masks, wherein a unique ID is provided for each of the plurality of ICs.*

*69. The method of claim 68, wherein the ID for the IC is used to track the IC and distinguish it from the other of the plurality of ICs.*

*70. The method of claim 60, wherein the identification circuit is disabled at a time when the identification circuit is not being used to generate the ID.*

*71. The method of claim 70, wherein voltages applied to the identification circuit serve to reduce electrical stress on the identification circuit when the identification circuit is not being used to generate the ID.*

*72. The method of claim 60, wherein the parametric variations are based on mismatches of voltage threshold, transistor width, dielectric thickness or other parametric variables in a manufacturing process for the IC.*

*73. The method of claim 60, wherein the identification circuit has a number of outputs, wherein the number of outputs of the identification circuit is determined based on a total number of ICs to be identified.*

*74. The method of claim 73, wherein the number of outputs of the identification circuit also is determined based on a drift factor for a manufacturing process used to manufacture the IC.*

*75. The method of claim 73, wherein the number of outputs of the identification circuit is determined so as to provide an ID of a desired degree of probability.*

*76. The method of claim 60, wherein the IC is employed in a system, wherein the system is operated, wherein the generated ID is used: to track a source of manufacturing; to identify the system employing the IC; to validate a transaction; to route a message; to track an item through customs; to verify a royalty; to recover a stolen good; or to validate software.*

*77. The method of claim 60, wherein the identification circuit is accessed via one or more signals provided internal to the IC.*

*78. The method of claim 60, wherein the identification circuit is accessed via one or more signals provided external to the IC.*

*79. The method of claim 60, wherein the ID is generated by accessing at least certain of a plurality of identification cells in a predetermined sequence.*

*80. The method of claim 79, wherein the predetermined sequence comprises a linear sequence.*

*81. The method of claim 79, wherein the plurality of identification cells are selectively accessed based on a previous measurement of a parametric value associated with particular identification cells.*

*82. The method of claim 81, wherein the plurality of identification cells are selectively accessed to generate a deterministic ID.*

*83. The method of claim 60, wherein the IC also includes one or more cells outputting a predetermined code that is common to a plurality of ICs.*

*84. The method of claim 83, wherein the predetermined code comprises a code that identifies a characteristic of the plurality of ICs or a source of manufacture of the plurality of ICs.*

*85. The method of claim 83, wherein the one or more cells outputting the predetermined code generate the predetermined code based on circuitry that is at least in part common with the identification circuit.*

*86. The method of claim 83, wherein the one or more cells outputting the predetermined code and at least a part of the output of the identification circuit are output in a mixed manner to output the predetermined code and to generate the ID.*

*87. The method of claim 60, wherein the ID is generated as a string of bits, wherein one of more bits are indicative of possible errors in the generation of the ID.*

*88. The method of claim 60, wherein the ID is generated based upon a sequence of voltage transitions.*

*89. The method of claim 60, wherein the ID is generated in a unique manner for the IC, wherein a manufacturing process for the IC does not require custom process steps or custom circuitry to generate the ID.*

*90. The method of claim 60, wherein the generated ID is stored in a memory.*

*91. The method of claim 90, wherein the memory is accessible by a CPU.*

*92. The method of claim 91, wherein software executed by the CPU makes available the generated ID stored in the memory.*

*93. The method of claim 92, wherein the memory comprises a CPU cache memory.*

*94. The method of claim 90, wherein the memory comprises a non-volatile memory.*

*95. A method for identifying a system using an identification number (ID), the method comprising the steps of:*

*operating the system, wherein the system employs an integrated circuit (IC), wherein the IC includes a plurality of identification cells each having an output that is a substantial function of random parametric variations in the IC;*

*generating the ID in response to the outputs of the plurality of identification cells, wherein the ID is a substantial function of random parametric variations in the IC.*

*96. The method of claim 95, wherein an ID for each of a plurality of ICs is generated and logged in a database.*

*97. The method of claim 96, wherein the IDs are generated during a test procedure for the ICs.*

*98. The method of claim 97, wherein the IDs are generated via an IC tester.*

*99. The method of claim 95, wherein the plurality of identification cells are formed as separate cells.*

*100. The method of claim 95, wherein a plurality of ICs are manufactured using identical masks, wherein a unique ID is provided for each of the plurality of ICs.*

*101. The method of claim 100, wherein the ID for the IC is used to track the IC and distinguish it from the other of the plurality of ICs.*

*102. The method of claim 95, wherein the plurality of identification cells are formed in the IC as an array.*

*103. The method of claim 102, wherein the array is accessed to generate the ID for the IC based on signals including row and column signals that are applied to the array.*

*104. The method of claim 102, wherein a plurality of dummy identification cells are formed at an edge of the array, wherein the dummy identification cells are not used to generate the ID.*

*105. The method of claim 95, wherein voltages are applied to the plurality of identification cells to disable the identification cells at a time when the identification cells are not being used to generate the ID.*

*106. The method of claim 105, wherein the applied voltages serve to reduce electrical stress on the identifica-*

*tion cells when the identification cells are not being used to generate the ID.*

*107. The method of claim 95, wherein the parametric variations are based on mismatches of voltage threshold, transistor length, transistor width, dielectric thickness or other parametric variables in a manufacturing process for the IC.*

*108. The method of claim 95, wherein the plurality of identification cells are provided in a number that is determined based on a total number of ICs to be identified.*

*109. The method of claim 108, wherein the number also is determined based on a drift factor for a manufacturing process used to manufacture the IC.*

*110. The method of claim 108, wherein the number is determined so as to provide an ID of a desired degree of probability.*

*111. The method of claim 95, wherein the IC is employed in a system, wherein the system is operated, wherein the generated ID is used: to track a source of manufacturing; to identify the system employing the IC; to validate a transaction; to route a message; to track an item through customs; to verify a royalty; to recover a stolen good; or to validate software.*

*112. The method of claim 95, wherein the plurality of identification cells are accessed via signals provided internal to the IC.*

*113. The method of claim 95, wherein the plurality of identification cells are accessed via signals provided external to the IC.*

*114. The method of claim 95, wherein the ID is generated by accessing at least certain of the plurality of identification cells in a predetermined sequence.*

*115. The method of claim 114, wherein the predetermined sequence comprises a linear sequence.*

*116. The method of claim 114, wherein the plurality of identification cells are selectively accessed based on a previous measurement of a parametric value associated with particular identification cells.*

*117. The method of claim 116, wherein the plurality of identification cells are selectively accessed to generate a deterministic ID.*

*118. The method of claim 95, wherein the IC also includes one or more cells outputting a predetermined code that is common to a plurality of ICs.*

*119. The method of claim 118, wherein the predetermined code comprises a code that identifies a characteristic of the plurality of ICs or a source of manufacture of the plurality of ICs.*

*120. The method of claim 118, wherein the one or more cells outputting the predetermined code generate the predetermined code based on circuitry that is common with circuitry that generates the ID.*

*121. The method of claim 118, wherein the one or more cells outputting the predetermined code and at least certain of the plurality of identification cells are accessed in a mixed manner to output the predetermined code and to generate the ID.*

*122. The method of claim 95, wherein the ID is generated as a string of bits, wherein one or more bits are indicative of possible errors in the generation of the ID.*

*123. The method of claim 95, wherein the ID is generated based upon a sequence of voltage transitions.*

*124. The method of claim 95, wherein the ID is generated in a unique manner for the particular IC, wherein a manufacturing process for the IC does not require custom process steps or custom circuitry to generate the ID.*

*125. The method of claim 95, wherein the generated ID is stored in a memory.*

*126. The method of claim 125, wherein the memory comprises a non-volatile memory.*

*127. The method of claim 125, wherein the memory is accessible by a CPU.*

*128. The method of claim 127, wherein software executed by the CPU makes available the generated ID stored in the memory.*

*129. The method of claim 125, wherein the memory comprises a CPU cache memory.*

*130. A method for identifying a system based on an identification number (ID), the method comprising the steps of:*

*generating the ID with an identification circuit within an integrated circuit (IC) employed in the system, wherein the identification circuit provides an output that is a substantial function of random parametric variations in the IC, wherein the ID is generated based on the output, wherein the ID is a substantial function of random parametric variations in the IC; and*

*identifying the system based on the ID.*

*131. The method of claim 130, wherein the IDs for each of a plurality of ICs are logged in a database.*

*132. The method of claim 131, wherein the IDs are generated during a test procedure for the ICs.*

*133. The method of claim 130, wherein the IDs are generated via an IC tester.*

*134. The method of claim 130, wherein the identification circuit comprises a plurality of identification cells.*

*135. The method of claim 134, wherein the plurality of identification cells are formed in the IC as an array.*

*136. The method of claim 135, wherein the array is accessed to generate the ID for the IC based on signals including row and column signals that are applied to the array.*

*137. The method of claim 135, wherein a plurality of dummy identification cells are formed at an edge of the array, wherein the dummy identification cells are not used to generate the ID.*

*138. The method of claim 134, wherein voltages are applied to the plurality of identification cells to disable the identification cells at a time when the identification cells are not being used to generate the ID.*

*139. The method of claim 138, wherein the applied voltages serve to reduce electrical stress on the identification cells when the identification cells are not being used to generate the ID.*

*140. The method of claim 134, wherein the plurality of identification cells are provided in a number that is determined based on a total number of ICs to be identified.*

*141. The method of claim 140, wherein the number also is determined based on a drift factor for a manufacturing process used to manufacture the IC.*

*142. The method of claim 140, wherein the number is determined so as to provide an ID of a desired degree of probability.*

*143. The method of claim 134, wherein the plurality of identification cells are accessed via signals provided internal to the IC.*

*144. The method of claim 134, wherein the plurality of identification cells are accessed via signals provided external to the IC.*

*145. The method of claim 134, wherein the ID is generated by accessing at least certain of the plurality of identification cells in a predetermined sequence.*

*146. The method of claim 145, wherein the predetermined sequence comprises a linear sequence.*

*147. The method of claim 145, wherein the plurality of identification cells are selectively accessed based on a*

*previous measurement of a parametric value associated with particular identification cells.*

*148. The method of claim 147, wherein the plurality of identification cells are selectively accessed to generate a deterministic ID.*

*149. The method of claim 134, wherein the IC also includes one or more cells outputting a predetermined code that is common to a plurality of ICs.*

*150. The method of claim 149, wherein the predetermined code comprises a code that identifies a characteristic of the plurality of ICs or a source of manufacture of the plurality of ICs.*

*151. The method of claim 149, wherein the one or more cells outputting the predetermined code generate the predetermined code based on circuitry that is at least in part common with circuitry that generates the ID.*

*152. The method of claim 149, wherein the one or more cells outputting the predetermined code and at least certain of the plurality of identification cells are accessed in a mixed manner to output the predetermined code and to generate the ID.*

*153. The method of claim 130, wherein a plurality of ICs are manufactured using identical masks, wherein a unique ID is provided for each of the plurality of ICs.*

*154. The method of claim 153, wherein the ID for the IC is used to track the IC and distinguish it from other of the plurality of ICs.*

*155. The method of claim 130, wherein the parametric variations are based on mismatches of voltage threshold, transistor length, transistor width, dielectric thickness or other parametric variables in a manufacturing process for the IC.*

*156. The method of claim 130, wherein the IC is employed in a system, wherein the system is operated, wherein the generated ID is used: to track a source of manufacturing; to identify the system employing the IC; to validate a transaction; to route a message; to track an item through customs; to verify a royalty; to recover a stolen good; or to validate software.*

*157. The method of claim 130, wherein the ID is generated as a string of bits, wherein one or more bits are indicative of possible errors in the generation of the ID.*

*158. The method of claim 130, wherein the ID is generated based upon a sequence of voltage transitions.*

*159. The method of claim 130, wherein the ID is generated in a unique manner for a particular IC, wherein a manufacturing process for the IC does not require custom process steps or custom circuitry to generate the ID.*

*160. The method of claim 130, wherein the generated ID is stored in a memory.*

*161. The method of claim 160, wherein the memory is accessible by a CPU.*

*162. The method of claim 161, wherein software executed by the CPU makes available the generated ID stored in the memory.*

*163. The method of claim 162, wherein the memory comprises a CPU cache memory.*

*164. The method of claim 160, wherein the memory comprises a non-volatile memory.*

* * * * *